(12) United States Patent
Epstein et al.

(10) Patent No.: US 8,468,249 B2
(45) Date of Patent: Jun. 18, 2013

(54) UNICAST/MULTICAST ARCHITECTURE

(75) Inventors: Steve Epstein, Hashmonaim (IL); Yossi Tsuria, Jerusalem (IL)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 13/047,912

(22) Filed: Mar. 15, 2011

(65) Prior Publication Data

US 2011/0164543 A1 Jul. 7, 2011

Related U.S. Application Data

(60) Division of application No. 12/605,395, filed on Oct. 26, 2009, now Pat. No. 7,945,672, which is a continuation of application No. 10/297,806, filed as application No. PCT/IL01/00559 on Jun. 19, 2001, now Pat. No. 7,631,080.

(60) Provisional application No. 60/212,771, filed on Jun. 20, 2000.

(51) Int. Cl.
*G06F 15/16* (2006.01)
*G06F 15/173* (2006.01)

(52) U.S. Cl.
USPC ........... 709/226; 709/223; 709/224; 709/228; 709/229

(58) Field of Classification Search
USPC .... 709/203, 213, 217, 218, 219, 225; 725/87; 455/503
See application file for complete search history.

(56) References Cited

U.S. PATENT DOCUMENTS

| | | | | |
|---|---|---|---|---|
| 5,987,233 A * | 11/1999 | Humphrey | ............... | 709/217 |
| 6,633,765 B1 * | 10/2003 | Maggenti | ............... | 455/503 |
| 6,658,010 B1 | 12/2003 | Enns et al. | | |
| 6,721,789 B1 | 4/2004 | DeMoney | | |
| 6,728,211 B1 | 4/2004 | Peris et al. | | |
| 6,986,156 B1 | 1/2006 | Rodriguez et al. | | |
| 7,058,087 B1 * | 6/2006 | Oz et al. | ............... | 709/207 |
| 7,058,696 B1 * | 6/2006 | Phillips et al. | ............... | 709/219 |
| 7,082,133 B1 | 7/2006 | Lor et al. | | |
| 7,088,710 B1 | 8/2006 | Johnson et al. | | |
| 7,136,903 B1 * | 11/2006 | Phillips et al. | ............... | 709/217 |
| 7,170,905 B1 | 1/2007 | Baum et al. | | |
| 7,340,759 B1 | 3/2008 | Rodriguez | | |
| 7,467,097 B2 | 12/2008 | Hisamatsu et al. | | |
| 7,493,117 B2 | 2/2009 | Cai et al. | | |
| 7,685,224 B2 | 3/2010 | Nye | | |
| 7,913,282 B2 * | 3/2011 | Ishikawa et al. | ............... | 709/213 |
| 2001/0043611 A1 | 11/2001 | Kadambi et al. | | |
| 2001/0054087 A1 * | 12/2001 | Flom et al. | ............... | 709/218 |

(Continued)

OTHER PUBLICATIONS

Legout, A. et al. "Bandwidth Allocation Policies for Unicast and Multicast Flows", *IEEE*, (1999), pp. 254-261.

(Continued)

*Primary Examiner* — Quang N Nguyen
(74) *Attorney, Agent, or Firm* — Ladas & Parry LLP

(57) ABSTRACT

A system and method for providing content to users including a multicast sub-system providing content to multiple users and a unicast sub-system providing content to individual users. The multicast sub-system being operative to push to each of a plurality of user communities, content relating to the community and the unicast sub-system being operative to provide on demand to a user, content which has not been previously pushed to the user.

14 Claims, 42 Drawing Sheets

U.S. PATENT DOCUMENTS

| | | | |
|---|---|---|---|
| 2002/0007491 A1* | 1/2002 | Schiller et al. | 725/87 |
| 2002/0087370 A1 | 7/2002 | Brueckheimer et al. | |
| 2002/0156917 A1 | 10/2002 | Nye | |
| 2003/0018800 A1 | 1/2003 | Paila et al. | |
| 2003/0028635 A1* | 2/2003 | DeMent et al. | 709/225 |
| 2006/0229083 A1 | 10/2006 | Redi | |
| 2006/0252439 A1 | 11/2006 | Cai | |
| 2008/0134258 A1 | 6/2008 | Goose et al. | |

OTHER PUBLICATIONS

Nonnenmacher, I. et al. "Asynchronous Multicaset Pulse AMP", Institut EURECOM 06904, (1997), pp. 419-430.

Puetz, J. "Intelligent Satellite Overlay Networks Enable Quick Deployment of Future Internet Services" ViaSat, Inc., XP-000980338, (1998), pp. 137-142.

Bemers-Lee, T. et al. "Hypertext Transfer Protocol-HTTP/L0", *Network Working Group* RFCI945, (1996), pp. 1-60.

Wessels, D. et al. "Internet Cache Protocol (ICP), version 2", *Network Working Group* RFC 2186, (1997), pp. 1-9.

Wessels, D. et al. "Application of Internet Cache Protocol (ICP), version 2", *Network Working Group* RFC 2187, (1997), pp. 1-24.

Office Action dated Sep. 17, 2010 in U.S. Appl. No. 12/605,395.

* cited by examiner

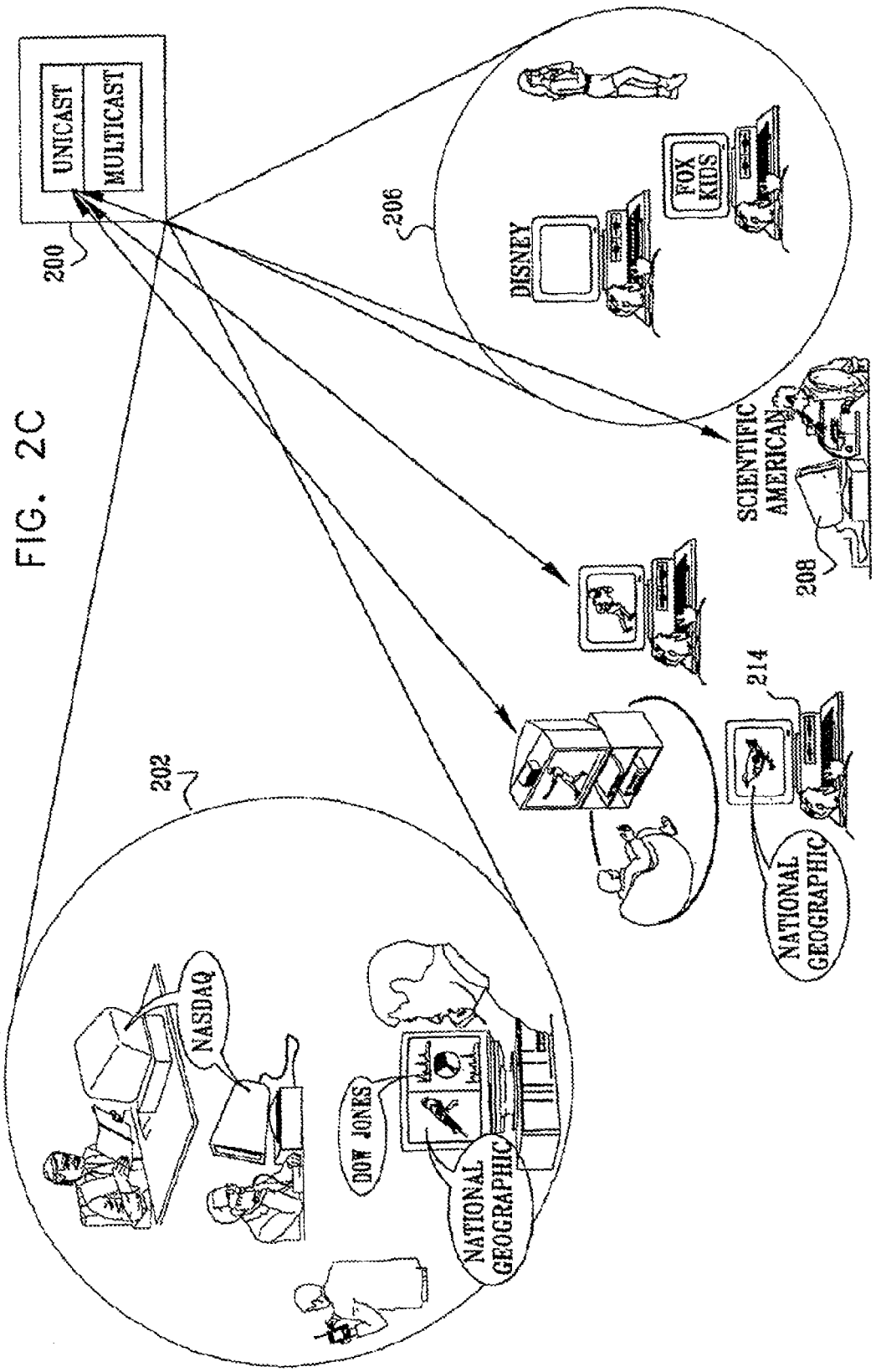

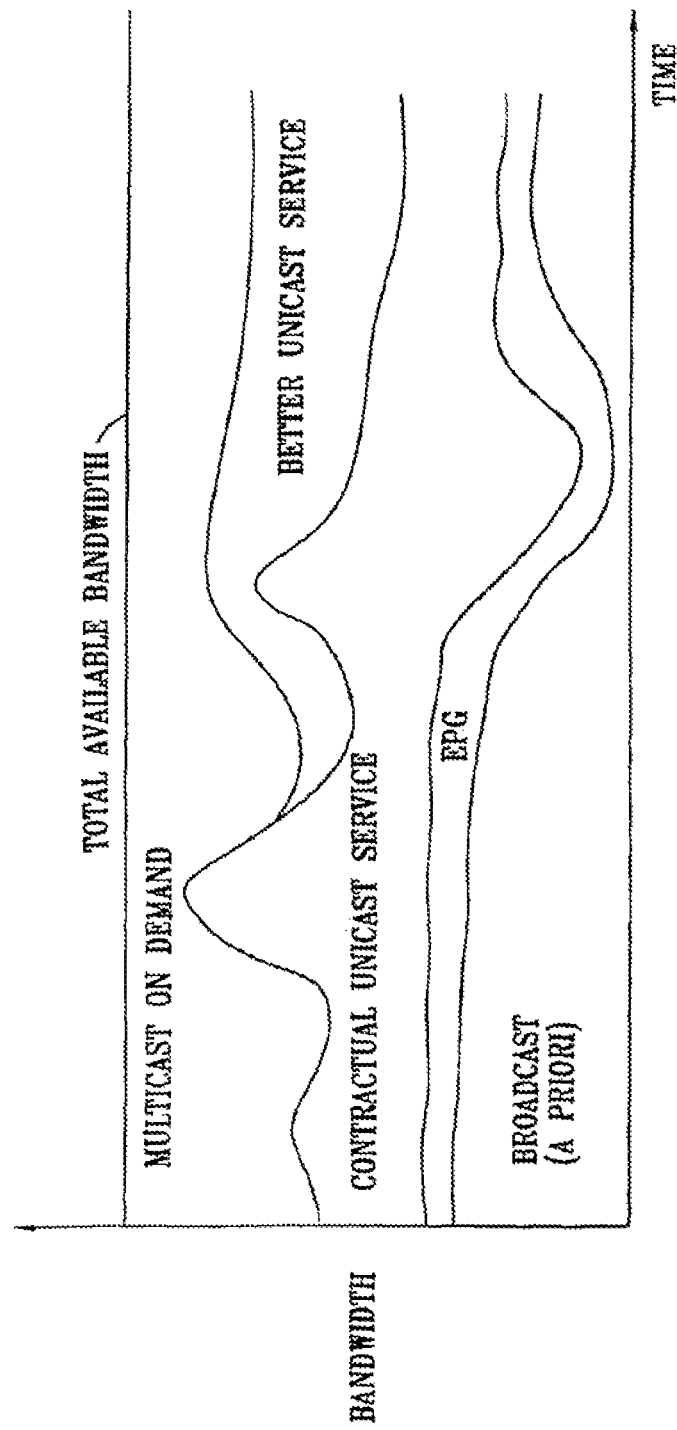

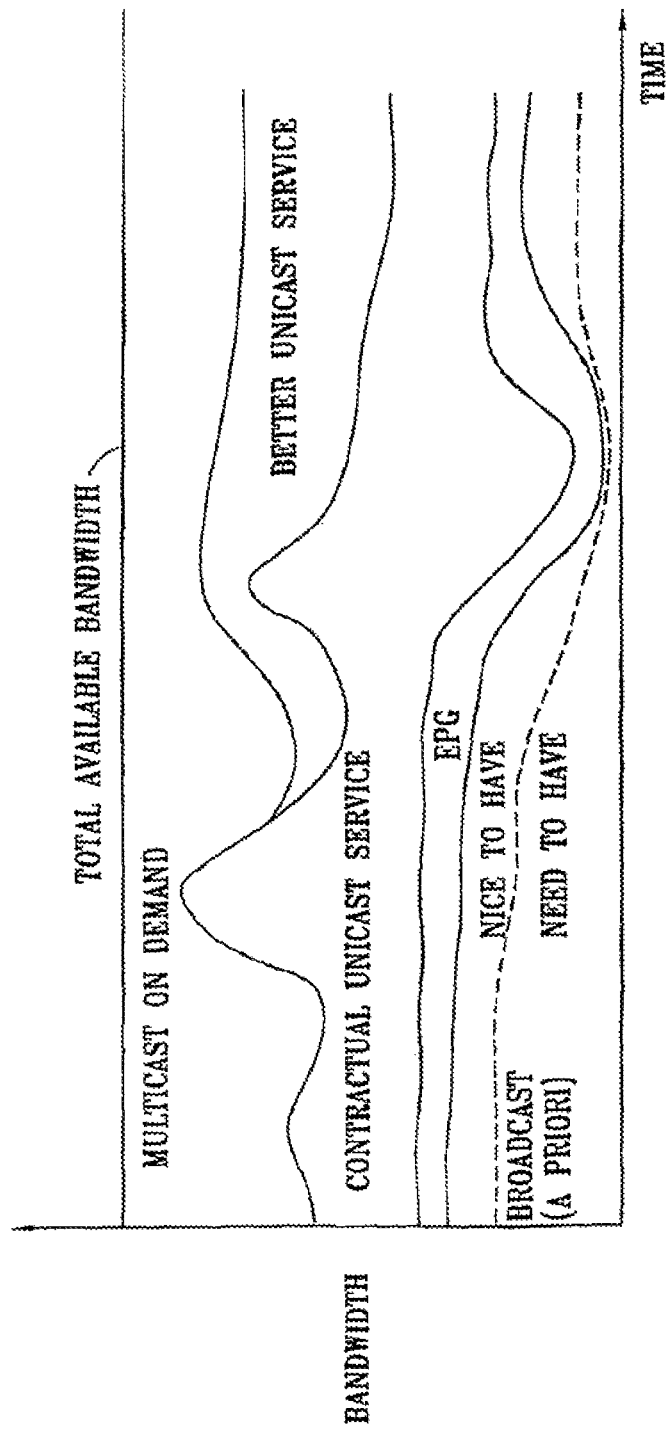

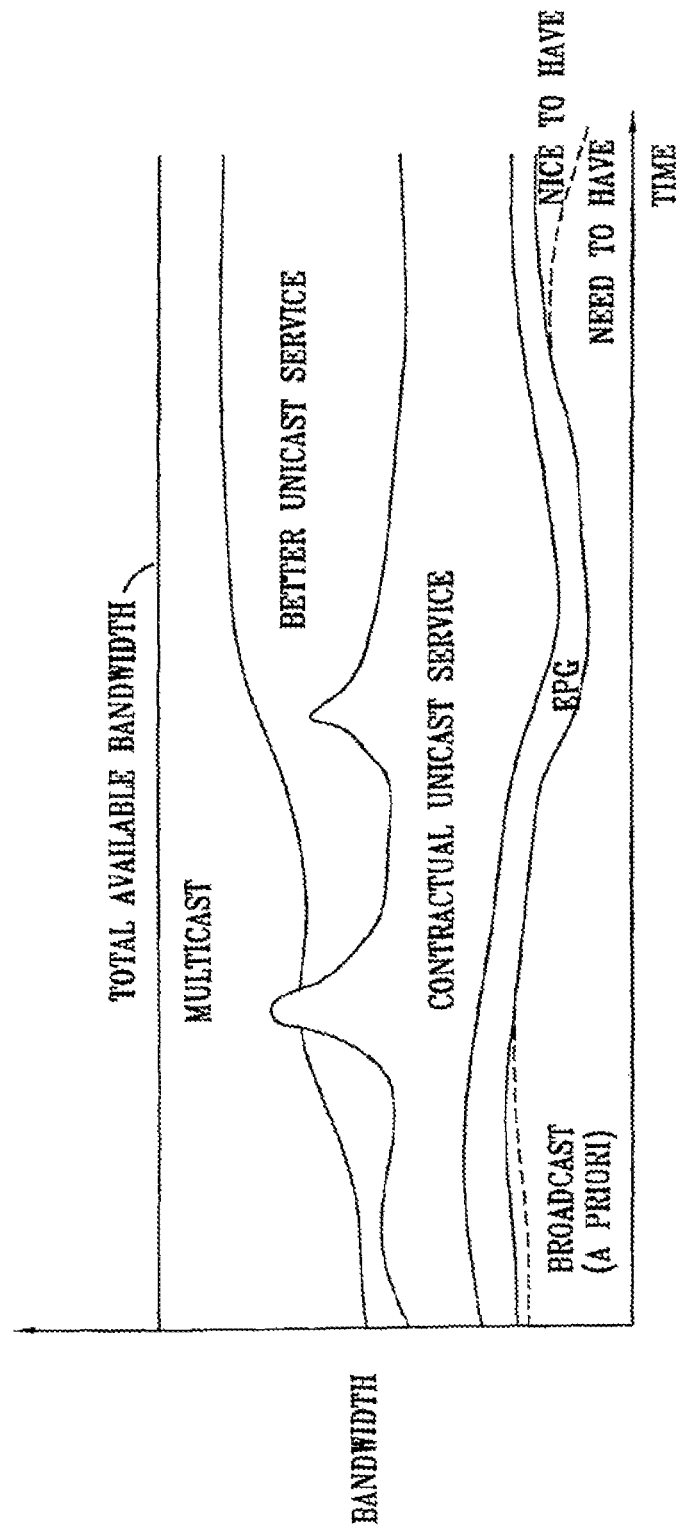

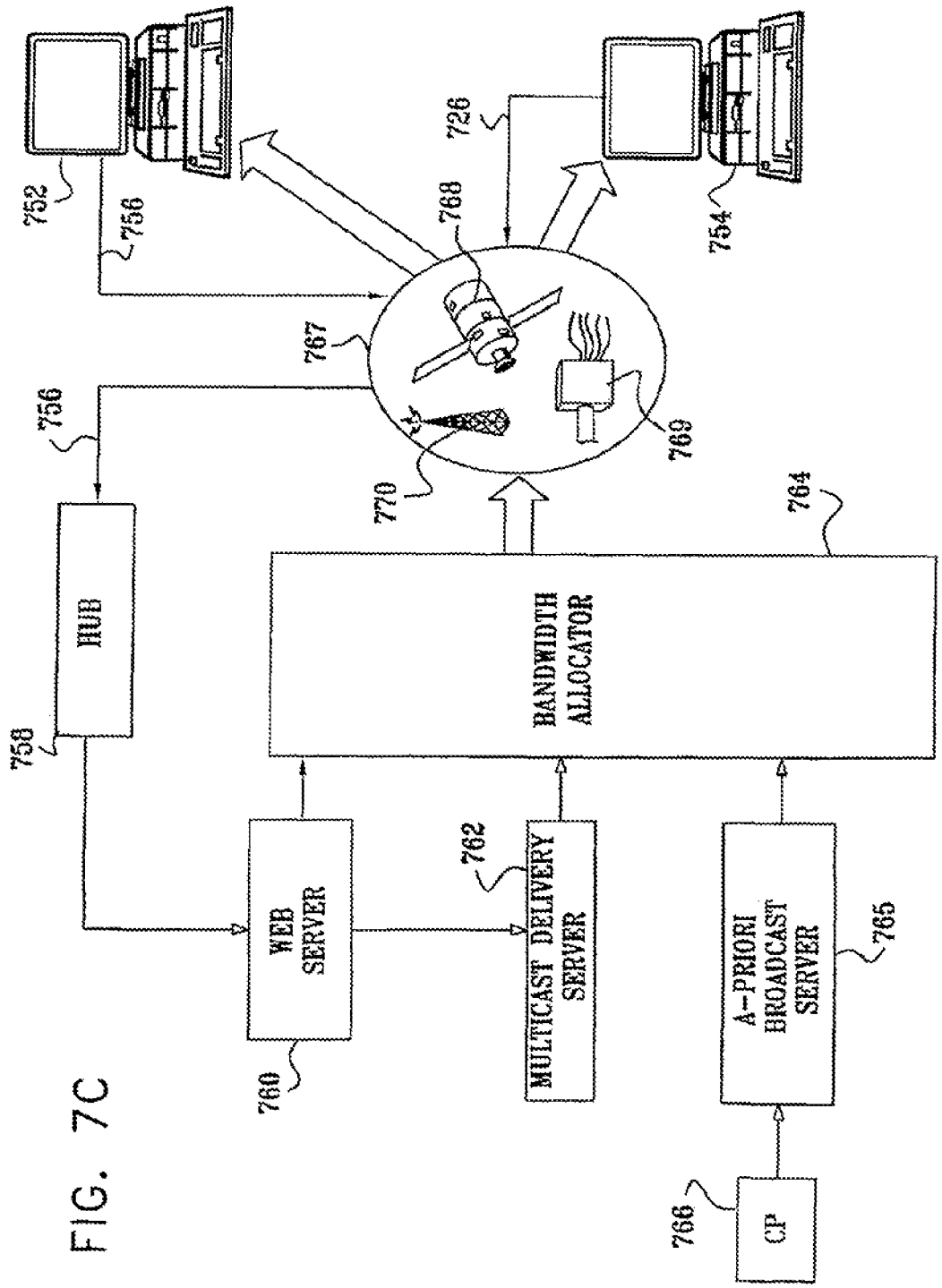

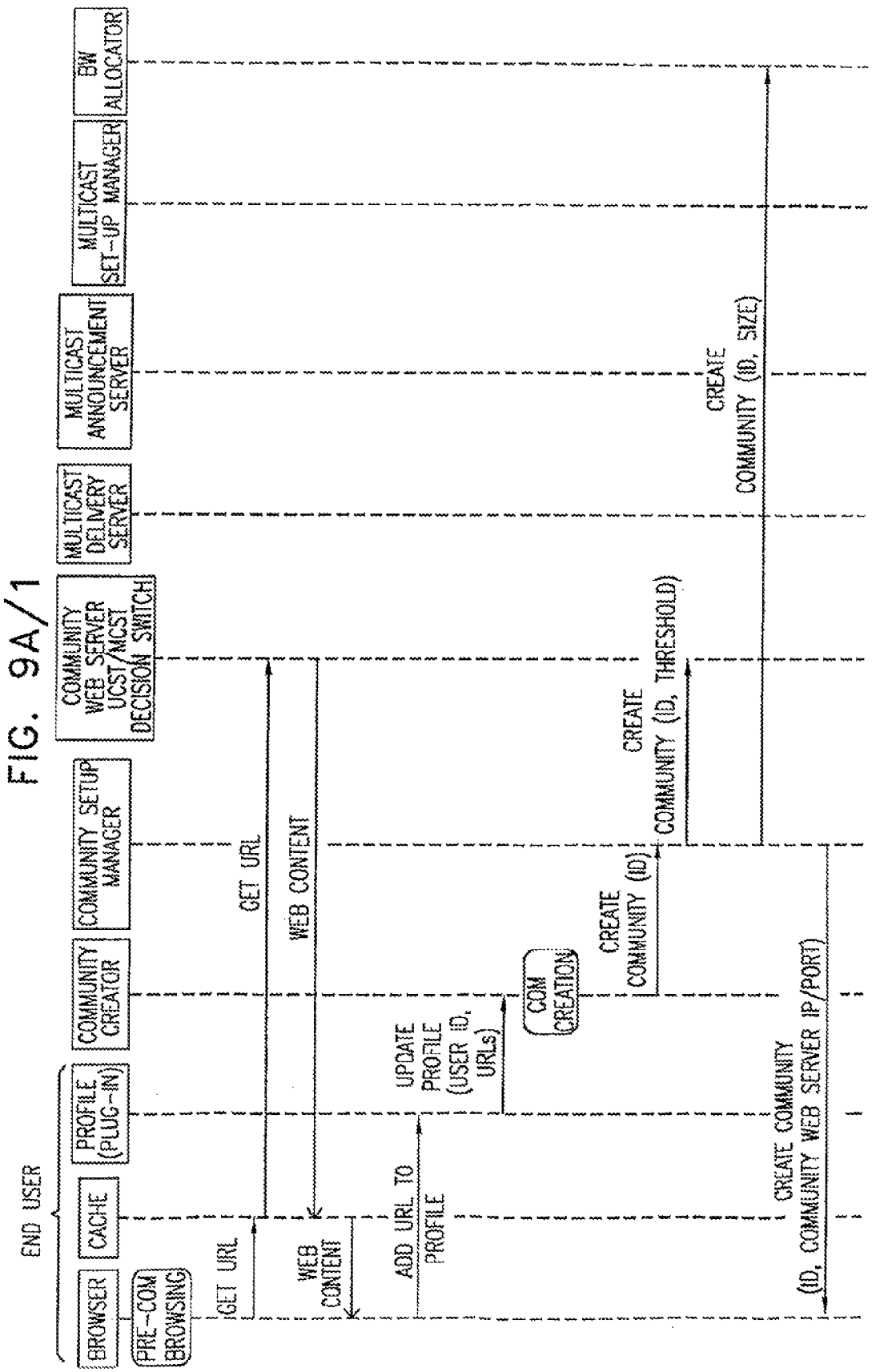
FIG. 9A/1

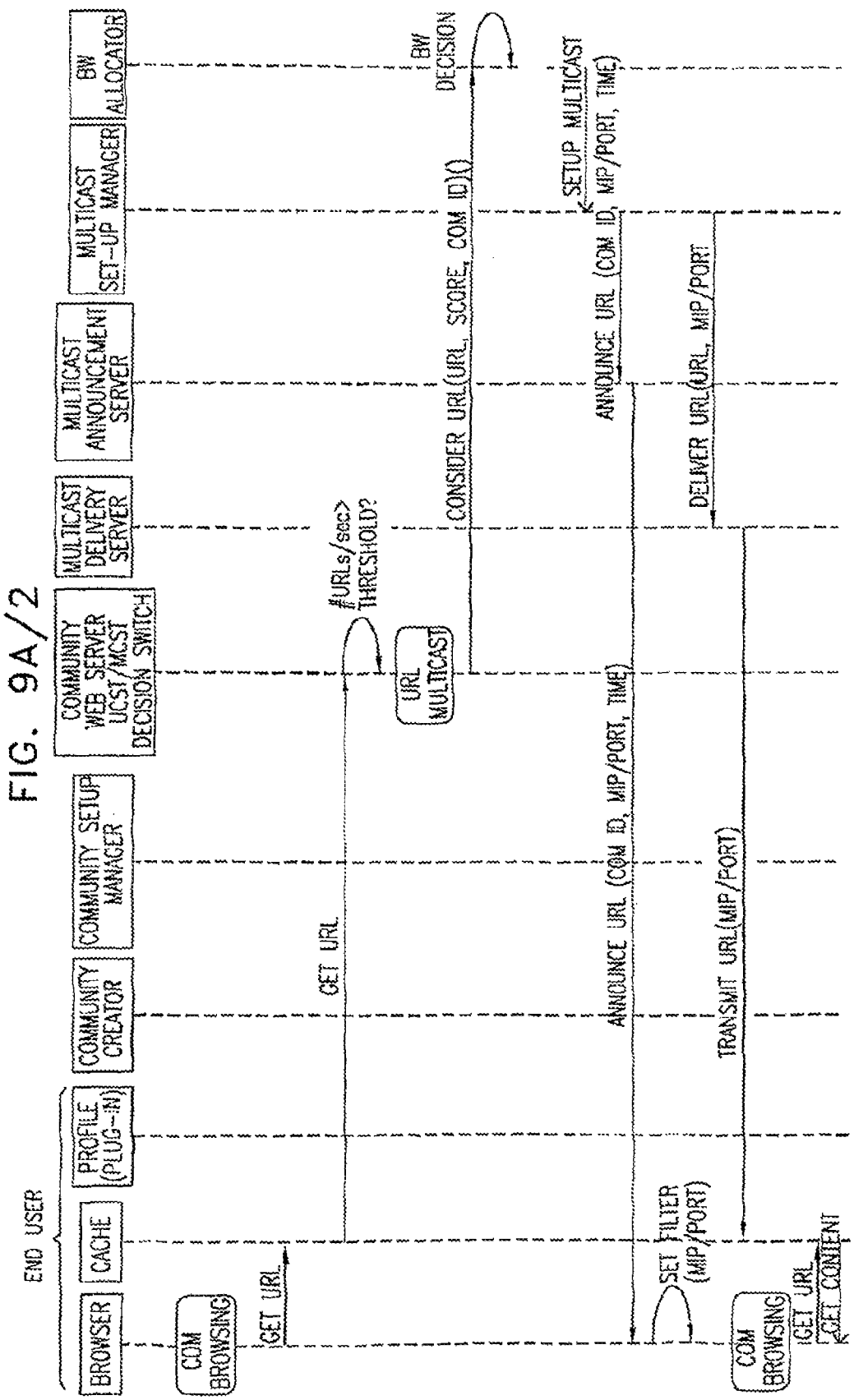

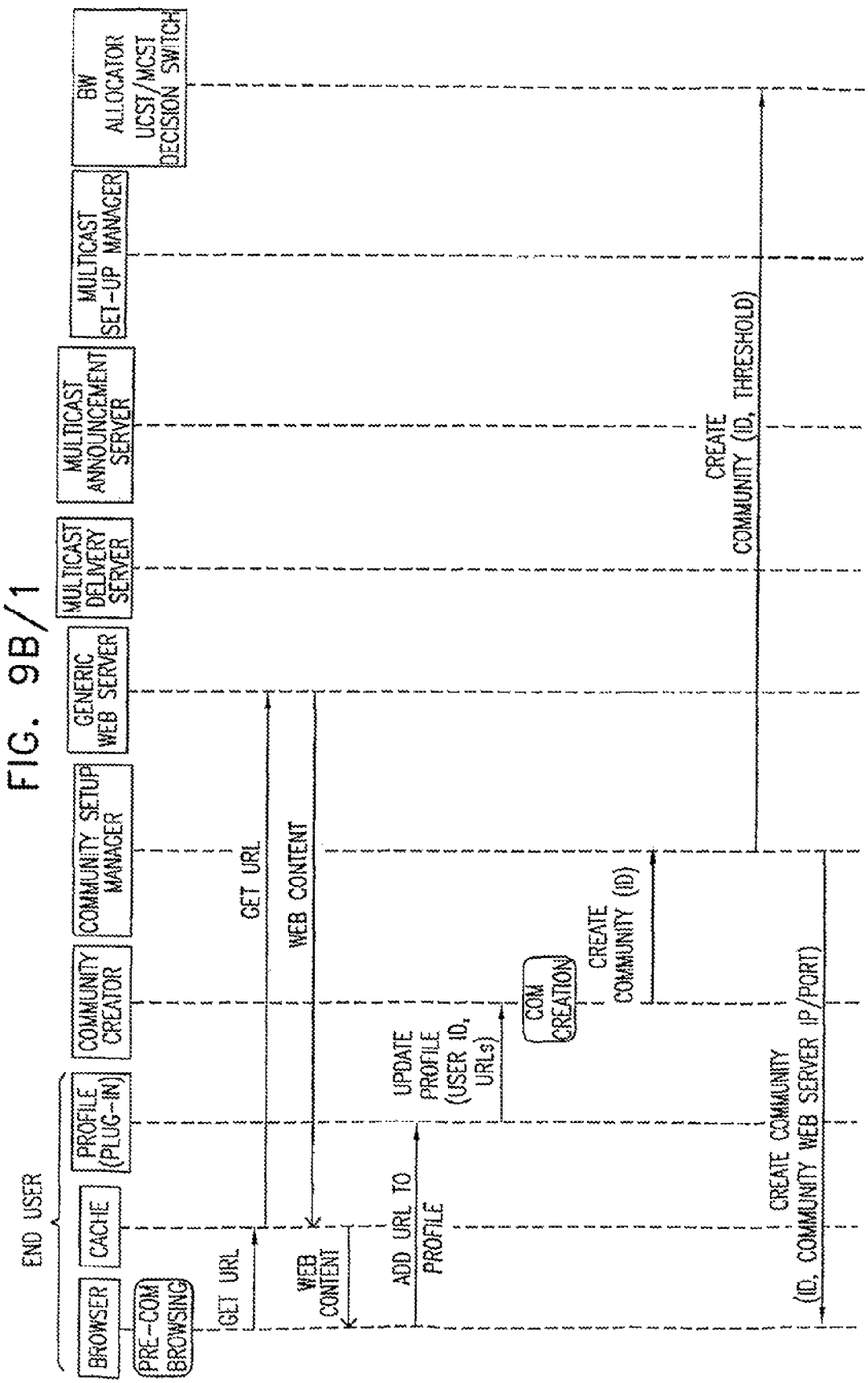

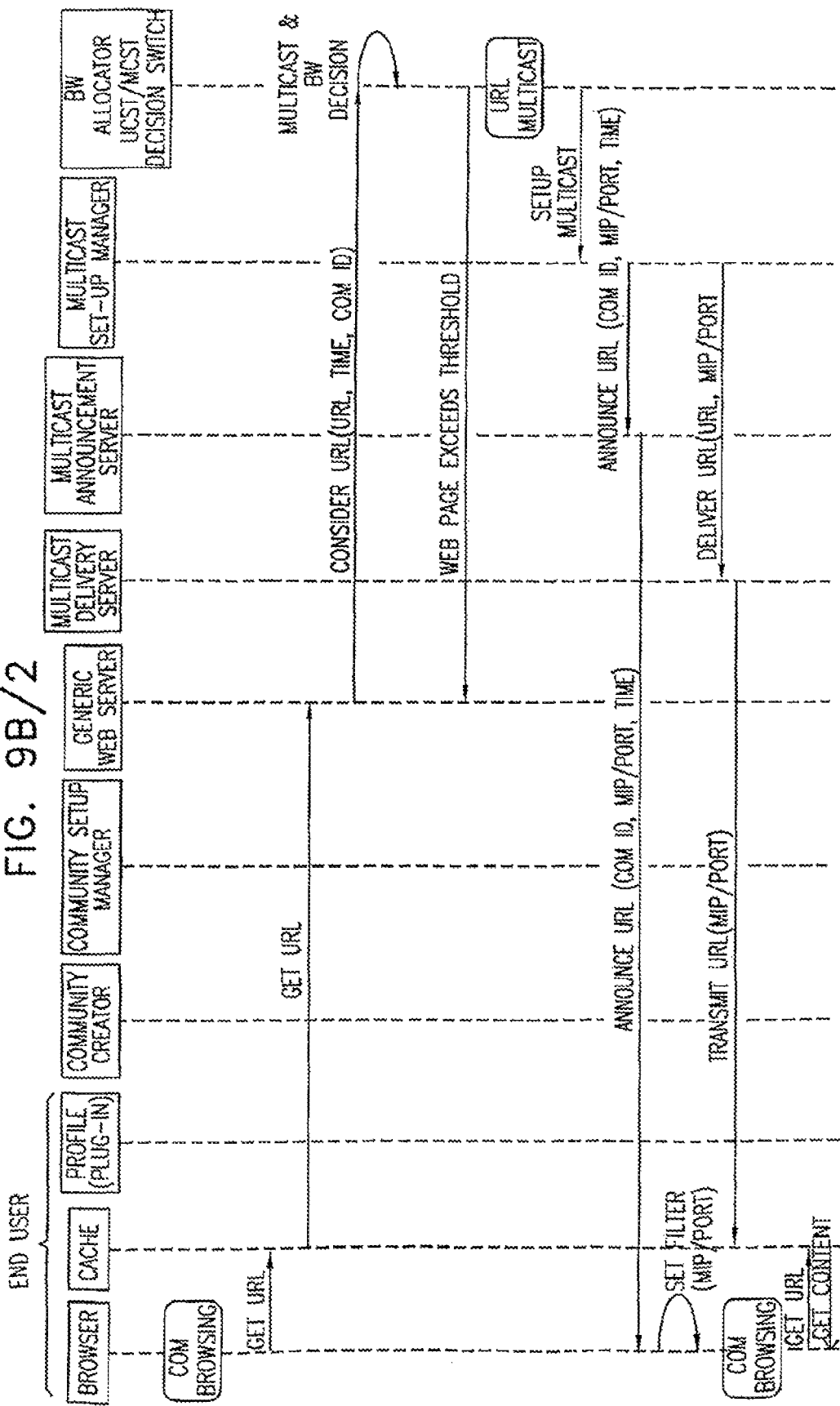

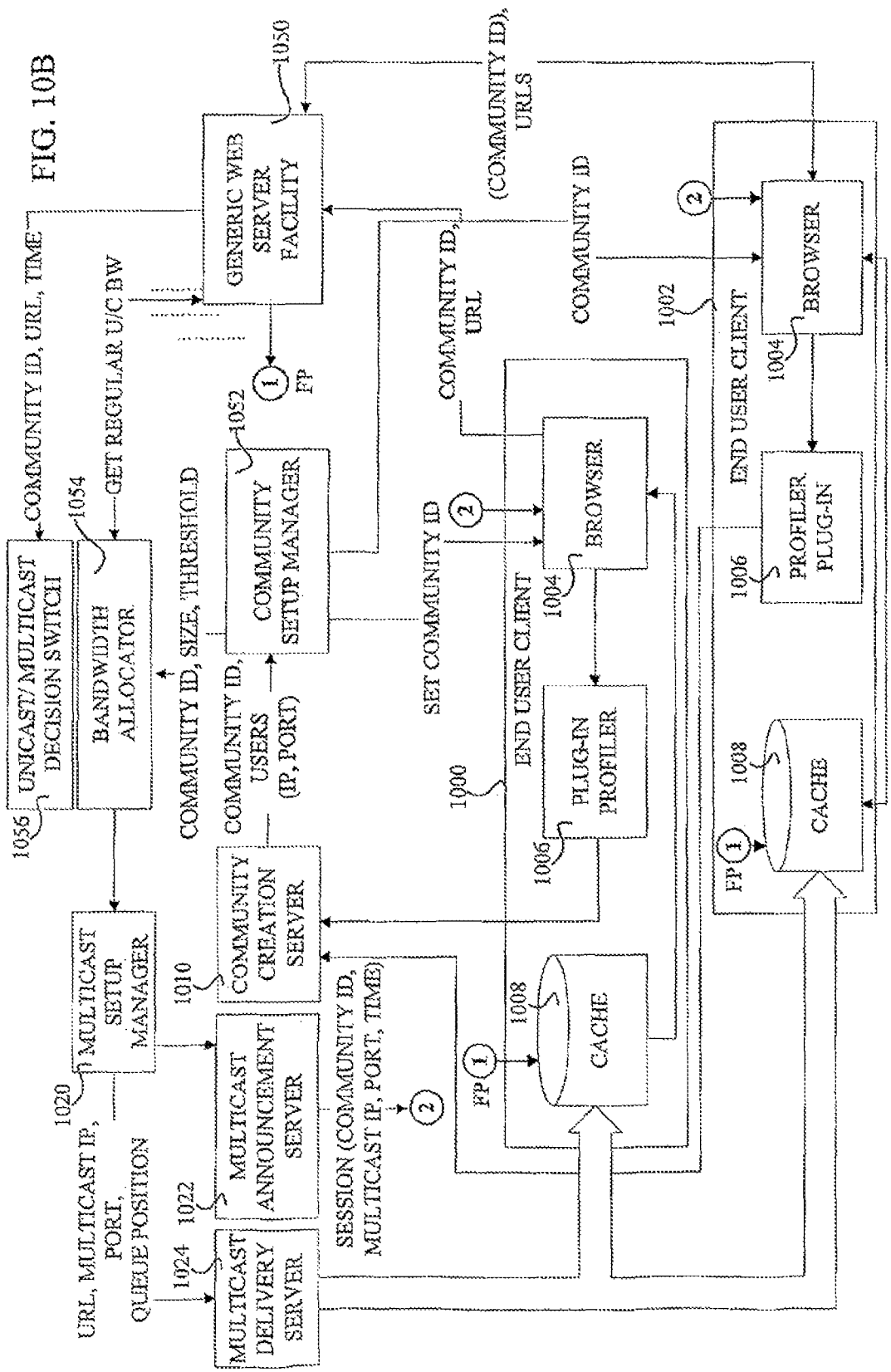

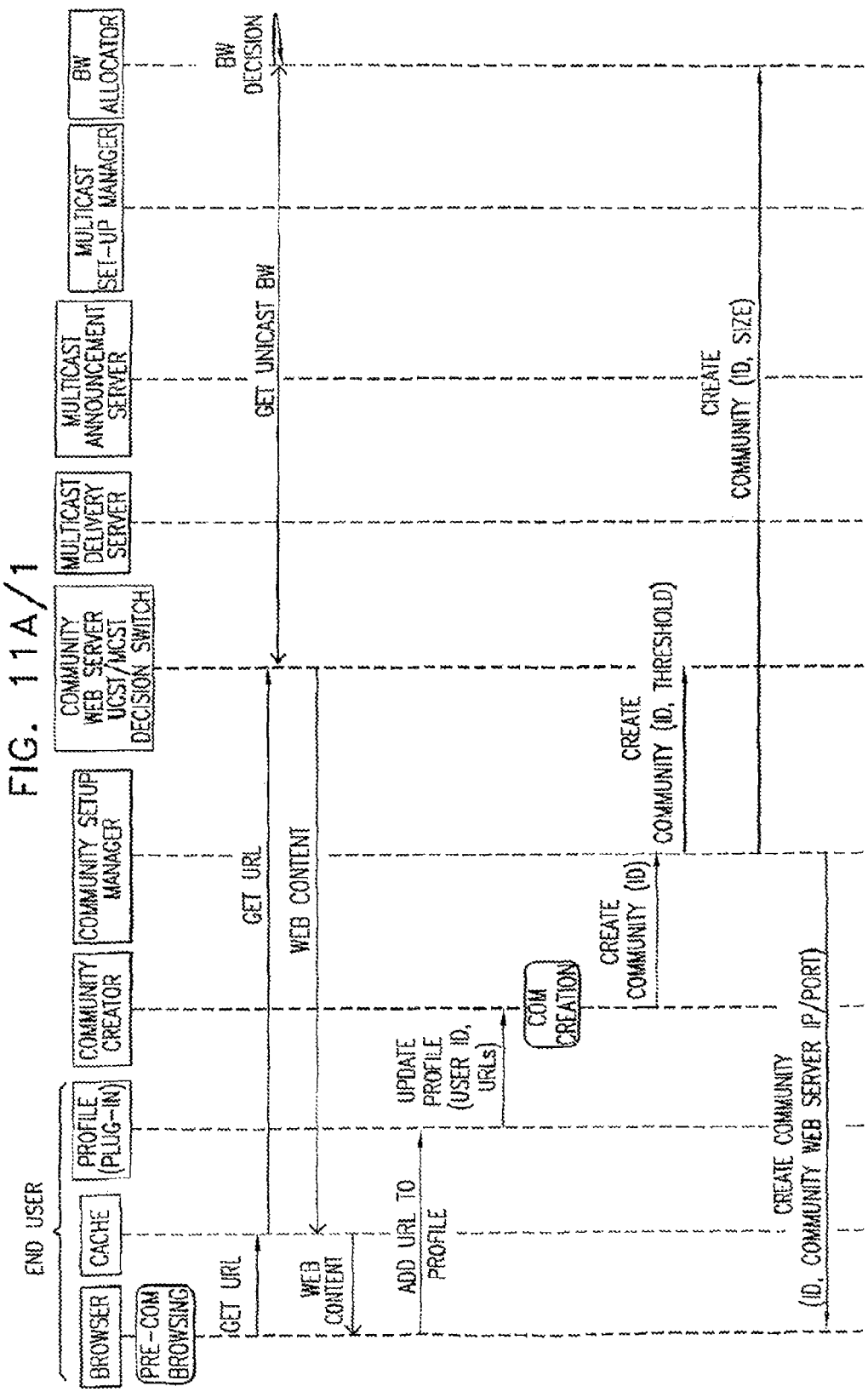

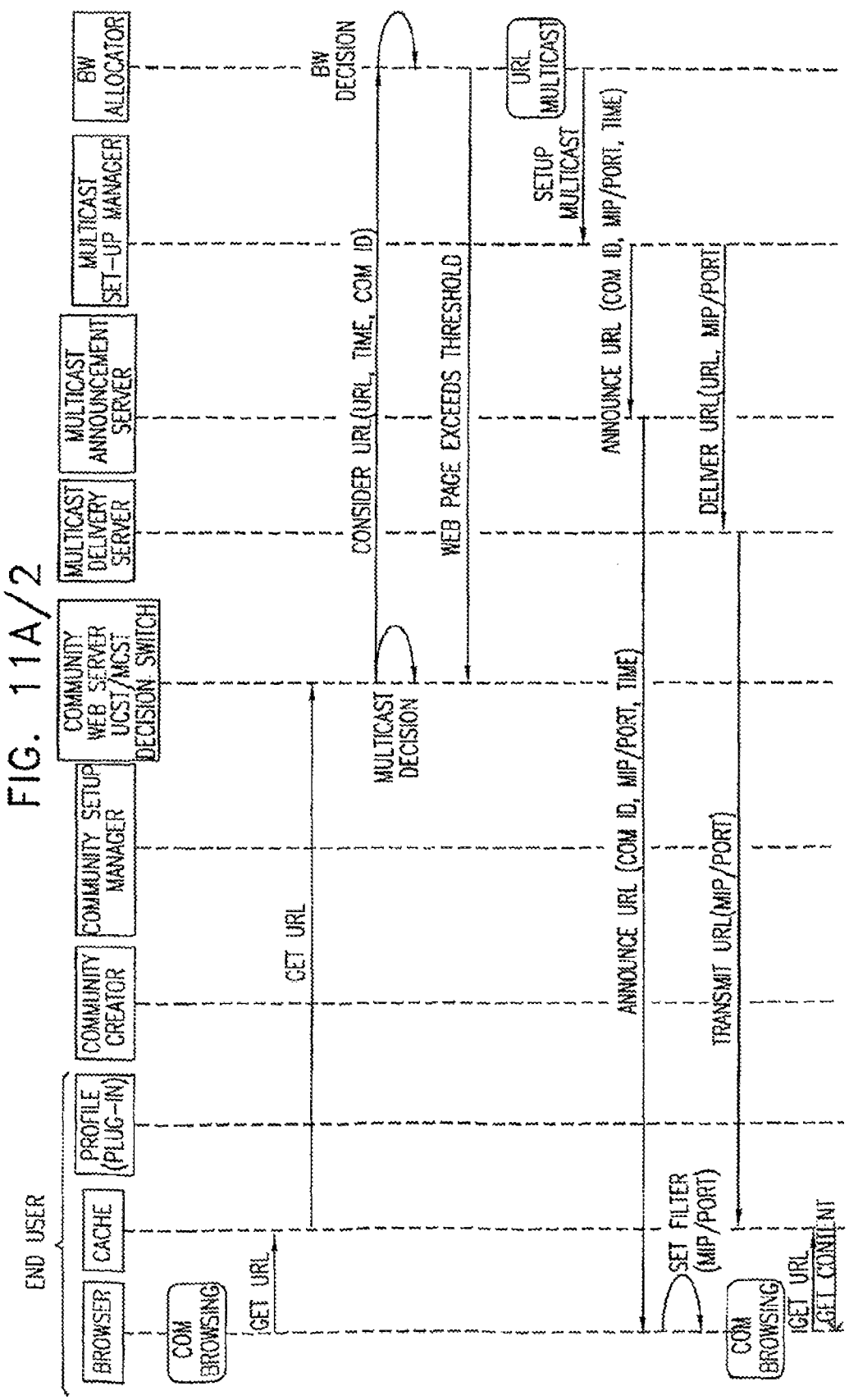
FIG. 11A/2

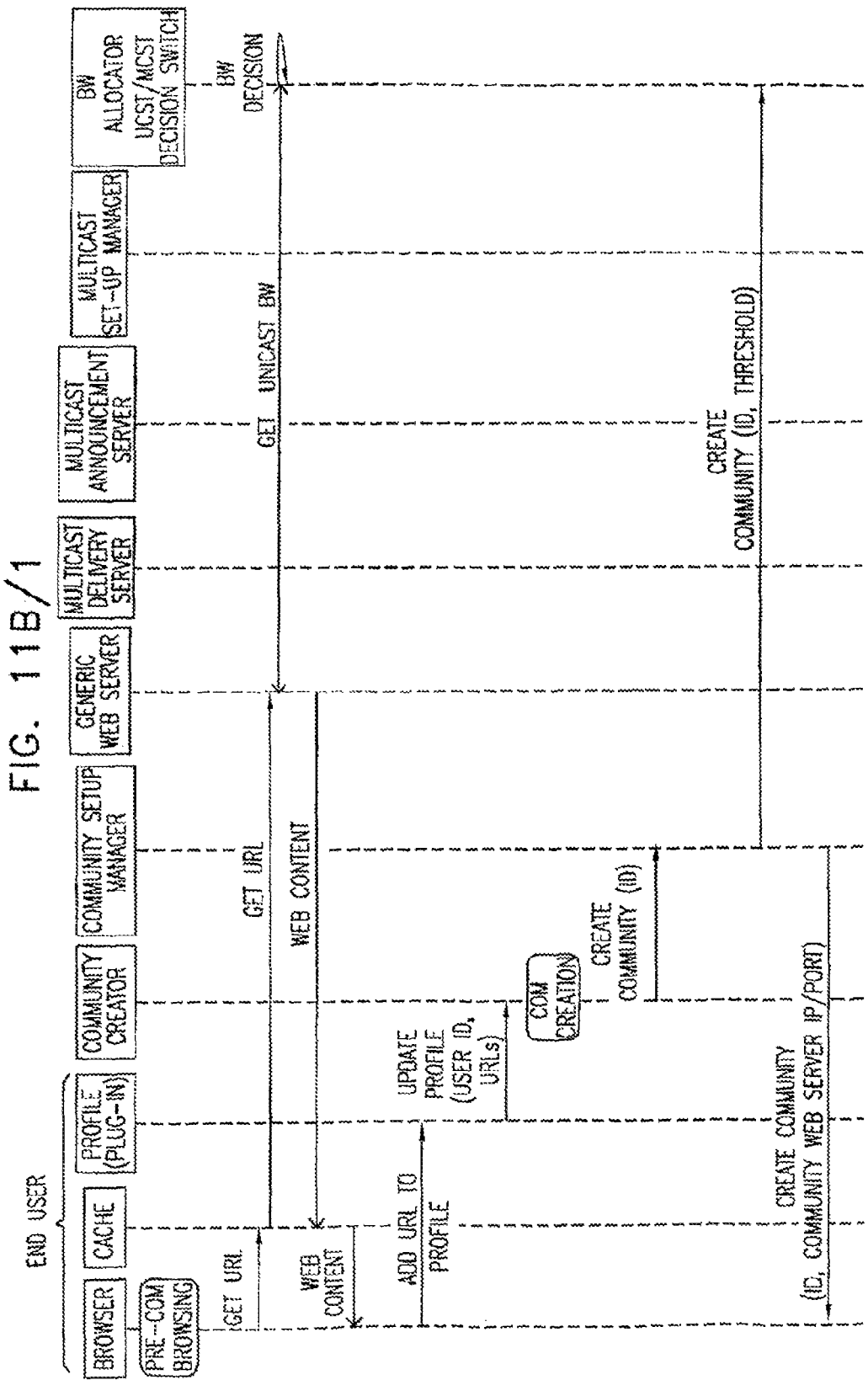

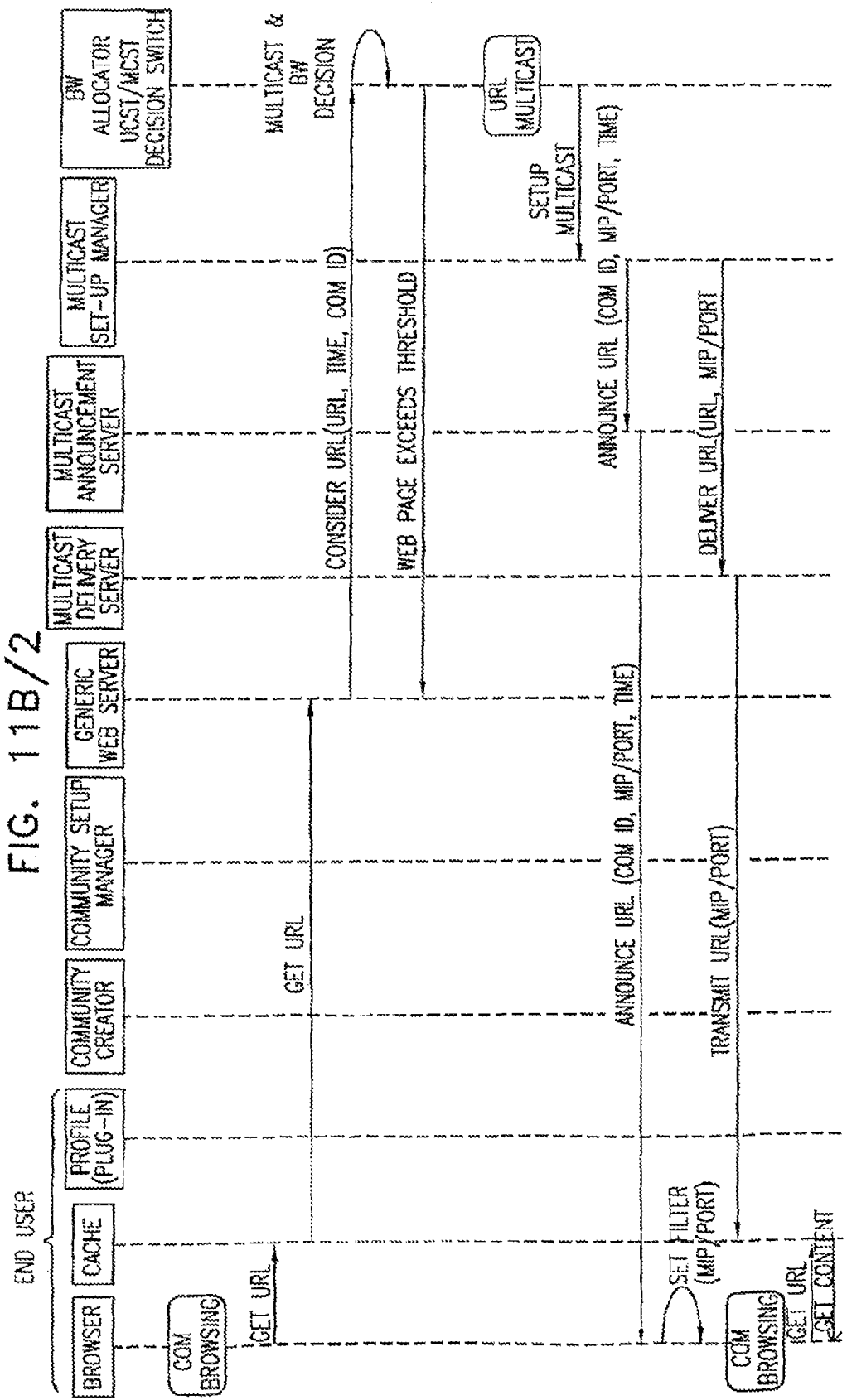
FIG. 11B/2

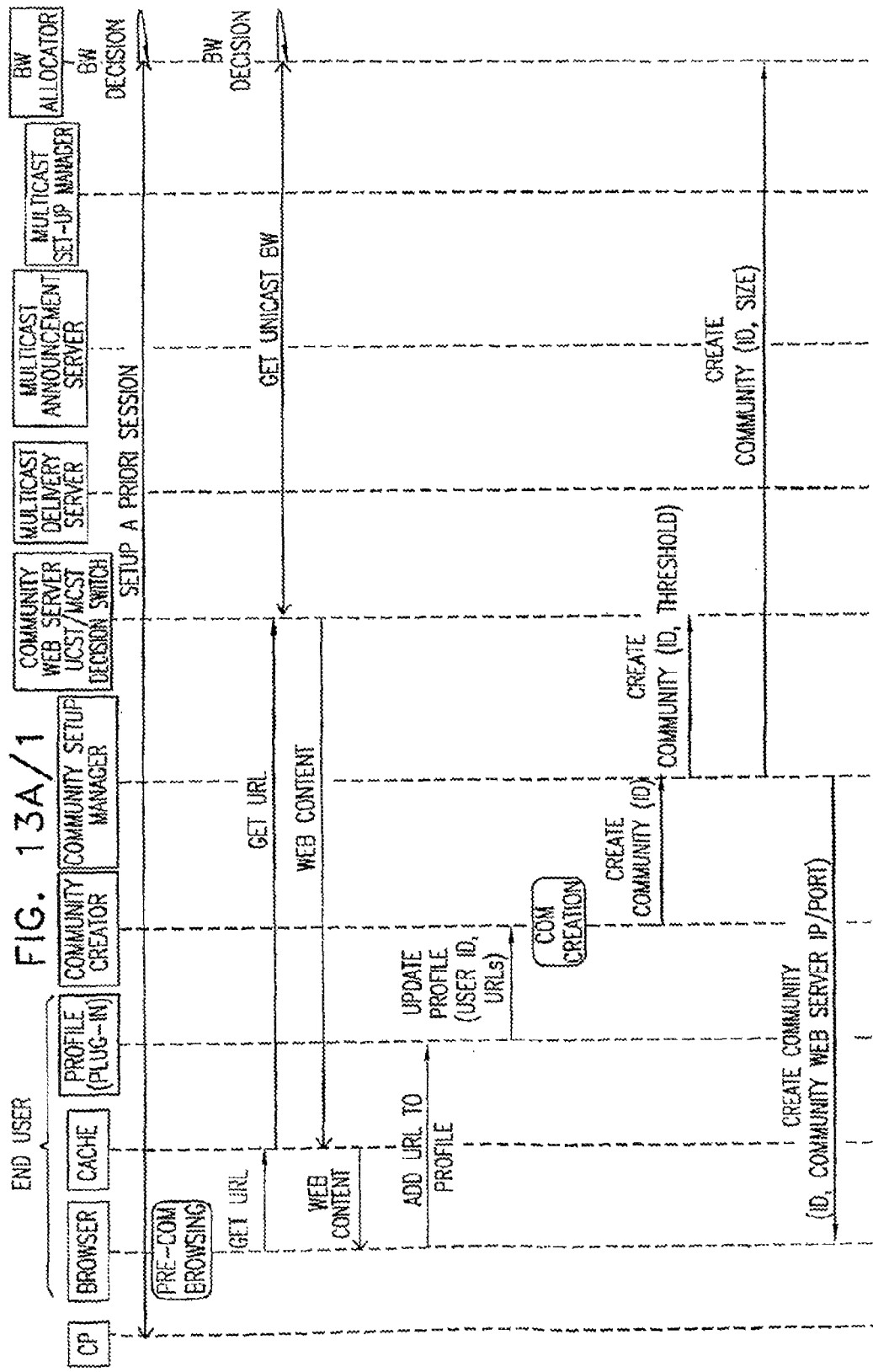

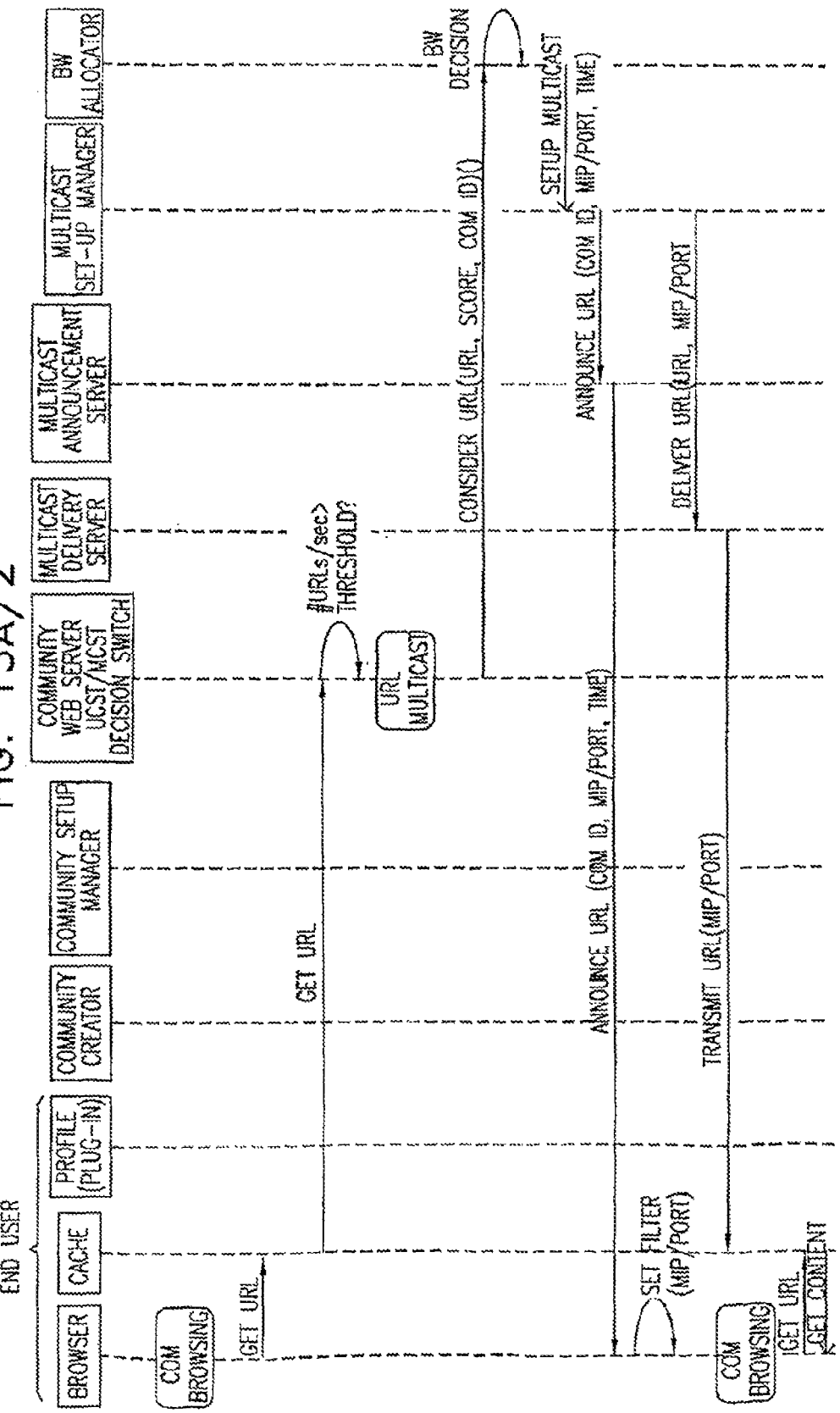
FIG. 13A/2

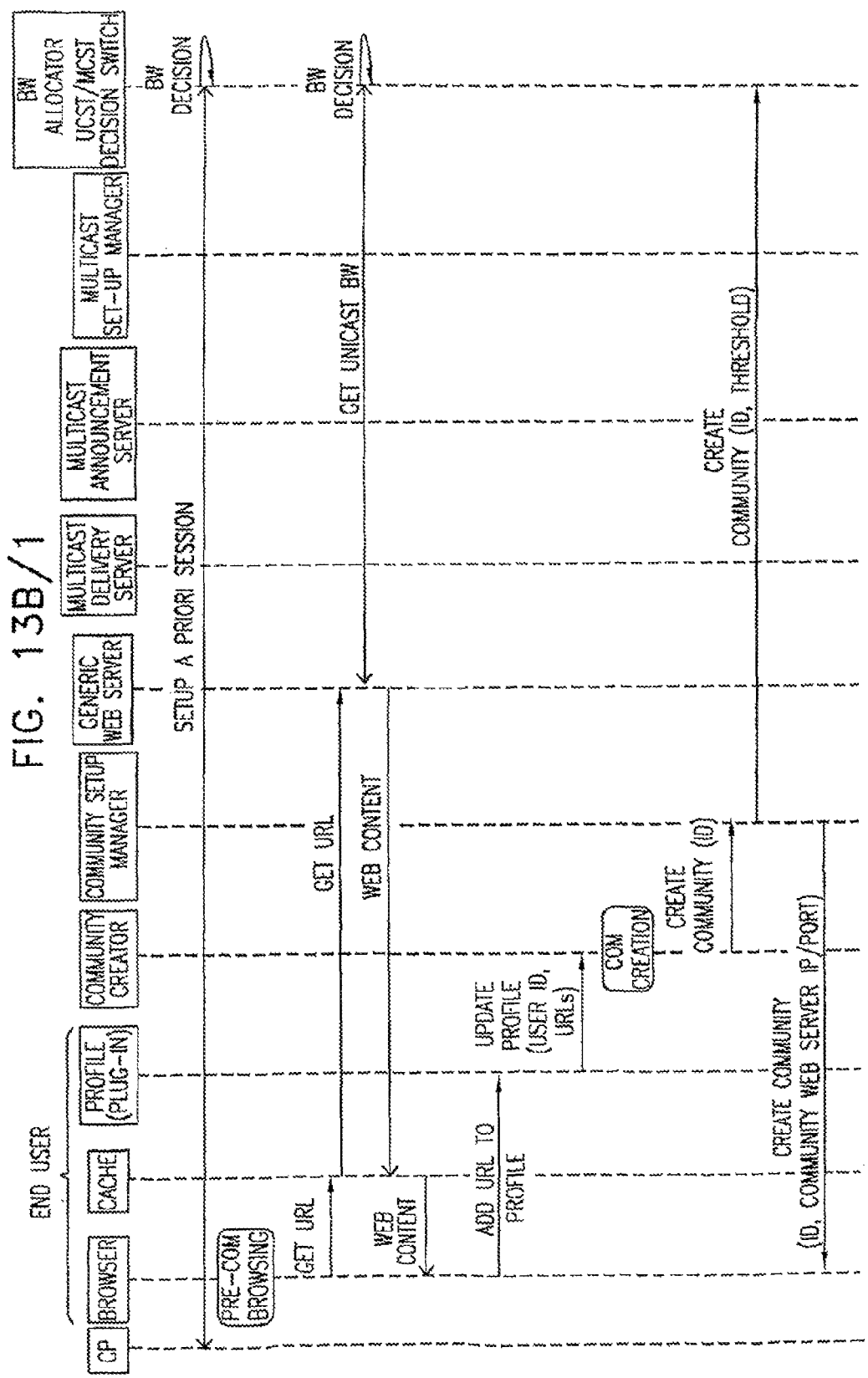

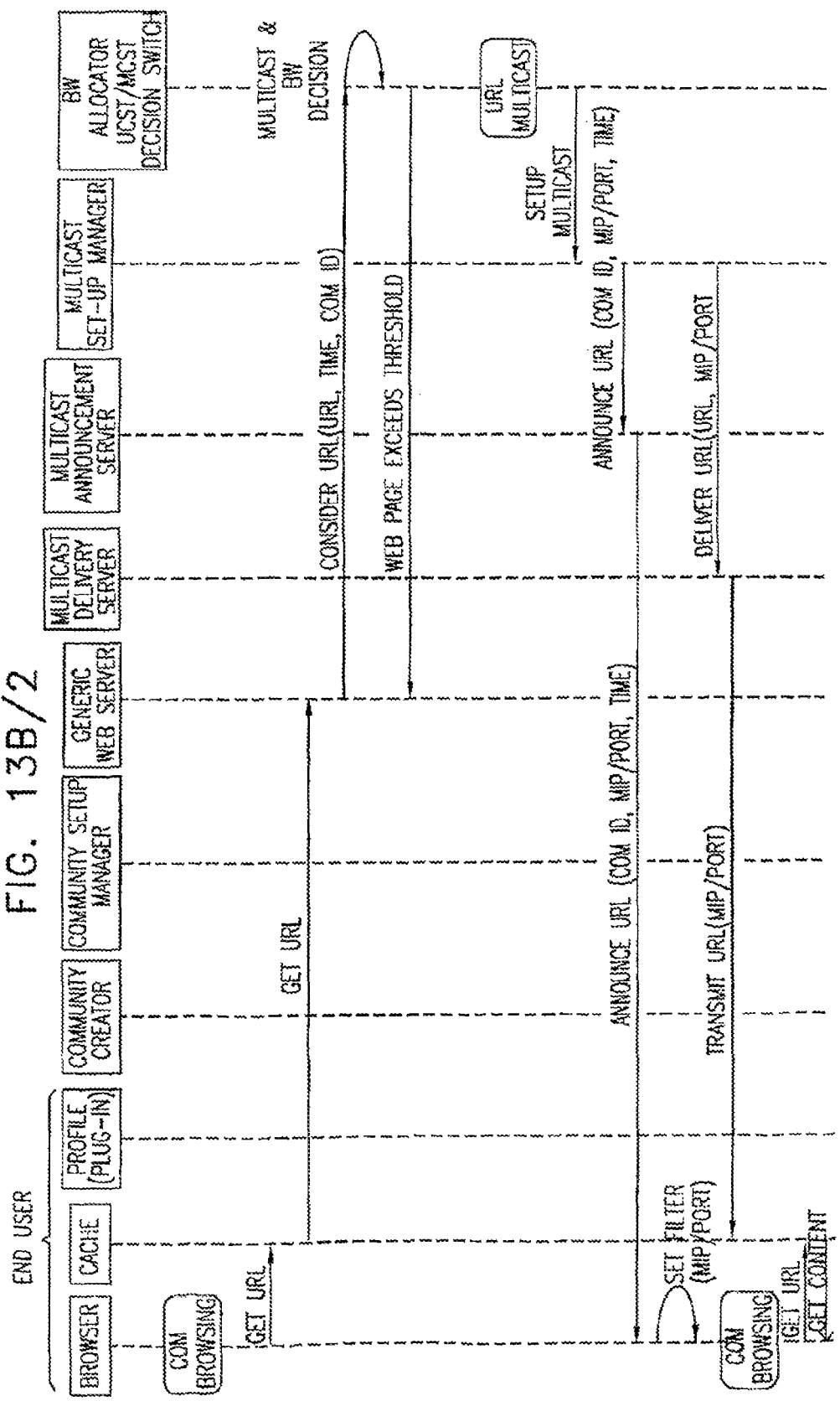
FIG. 13B/2

UNICAST/MULTICAST ARCHITECTURE

RELATED APPLICATION INFORMATION

The present application is a Divisional of U.S. patent application Ser. No. 12/605,395 filed Oct. 26, 2009, now U.S. Pat. No. 7,945,672, which is a Continuation of U.S. patent application Ser. No. 10/297,806, filed May. 8, 2003, now U.S. Pat. No. 7,631,080, which is a 35 USC §371 application of PCT International Patent Application PCT/IL01/00559, which was filed on 19 Jun. 2001 and titled "UNICAST / MULTICAST ARCHITECTURE", which was published in the English language on 27 Dec. 2001 with publication number WO 01/99370, and which claimed priority from US Provisional Patent Application Ser. No. 60/212,771 filed on 20 Jun. 2000.

FIELD OF THE INVENTION

The present invention relates generally to systems and methodologies for providing content to users via electronic media.

BACKGROUND OF THE INVENTION

The following patents and other publications are believed to represent the current state of the art:

U.S. patent application Ser. No. 09/283,598 of Kipnis et al, filed 1 Apr. 1999, and corresponding published UK Patent Application 2,351,891;

U.S. patent application Ser. No. 09/285,214 of Richardson et al, filed 1 Apr. 1999, and corresponding published UK Patent Application 2,348,530;

a product called SQUID WEB PROXY CACHE, described at World Wide Web site www.squid.org;

an article by Steve Epstein et al, entitled "Macro and Micro Scheduling", published in NDS Technical Disclosure Bulletin, vol. 1, number 1, September 1999, at pages 6-8; and the following RFC documents, available at World Wide Web site www.ietf.org:

1. RFC 1945, entitled "Hypertext Transfer Protocol—HTTP/1.0", dated May 1996.
2. RFC 2186, entitled "Internet Cache Protocol (ICP), version 2", dated September 1997.
3. RFC 2187, entitled "Application of Internet Cache Protocol (ICP), version 2", dated September 1997.

The disclosures of all references mentioned above and throughout the present specification are hereby incorporated herein by reference.

SUMMARY OF THE INVENTION

The present invention seeks to provide improved systems and methodologies for providing content to users via electronic media.

There is thus provided in accordance with a preferred embodiment of the present invention a system for providing content to users including a multicast sub-system providing content to multiple users and a unicast sub-system providing content to individual users. The multicast sub-system is operative to push to each of a plurality of user communities, content relating to the community and the unicast sub-system being operative to provide on demand to a user, content which has not been previously pushed to the user.

There is also provided in accordance with another preferred embodiment of the present invention a method for providing content to users. The method includes steps of multicasting content to multiple users and unicasting content to individual users. The step of multicasting includes pushing to each of a plurality of user communities, content relating to the community and the step of includes providing on demand to user, content which has not been previously pushed to the user.

There is also provided in accordance with a preferred embodiment of the present invention a system for providing content to user including a multicast sub-system providing content to multiple users and is operative to push to each of a plurality of user communities, content relating to the community and a bandwidth allocator operative to allocate bandwidth used by the multicast sub-system among the plurality of user communities.

There is further provided in accordance with a preferred embodiment of the present invention a system for providing content to users including at least one multicast sub-system providing content to multiple users, at least one unicast sub-system providing content to individual users and a bandwidth allocator operative to allocate bandwidth among the at least one multicast sub-system and the at least one unicast sub-system.

There is provided in accordance with another preferred embodiment of the present invention a system for providing content to users including a multicast sub-system providing content to multiple users and being operative to push to each of a plurality of user communities, content relating to the community based on at least a-priori determinations and current demand and a bandwidth allocator operative to allocate bandwidth used by the multicast sub-system among at least content based on a-priori determinations and content based on current demand.

There is also provided in accordance with yet another preferred embodiment of the present invention a system for providing content to users including multicast means for providing content to multiple users and unicast means for providing content to individual users, the multicast means being operative to push each of a plurality of user communities, content relating to the community and the unicast means being operative to provide on demand to a user, content which has not been previously pushed to the user.

There is further provided in accordance with another preferred embodiment of the present invention a system for providing content to user including multicast means providing content to multiple users and being operative to push to each of a plurality of user communities, content relating to the community and bandwidth allocator means operative to allocate bandwidth used by the multicast means among the plurality of user communities.

There is also provided in accordance with a further preferred embodiment of the present invention a system for providing content to users including at least one multicast means for providing content to multiple users, at least, one unicast means for providing content to individual users and bandwidth allocator means operative to allocate bandwidth among the at least one multicast means and the at least one unicast means.

There is further provided in accordance with yet another preferred embodiment of the present invention a system for providing content to users. The system includes multicast means for providing content to multiple users and being operative to push to each of a plurality of user communities, content relating to the community based on at least a priori determinations and current demand and a bandwidth allocator operative to allocate bandwidth used by the multicast means among at least content based on a priori determinations and content based on current demand.

There is also provided in accordance with yet another preferred embodiment of the present invention a system for providing unicast and multicast content to users and including bandwidth allocation means for providing a guaranteed minimum level of unicast service to the extent required and wherein bandwidth remaining from the provision of the guaranteed minimum level of unicast service is employed for multicast, the same broadcast network providing both unicast and multicast.

There is further provided in accordance with a preferred embodiment of the present invention a system for providing unicast and multicast content to users and including bandwidth allocation means for allocating highest priority to a-priori content and next highest priority to unicast and for allocating remaining bandwidth to multicast.

Further in accordance with a preferred embodiment of the present invention the system also includes a plurality of satellites having at least one of the following functionalities: broadcast, multicast and unicast.

Still further in accordance with a preferred embodiment of the present invention the system also includes at least one of cable networks, digital terrestrial networks, microwave networks, cellular networks and DSL networks having at least one of the following functionalities: broadcast, multicast and unicast.

Preferably, the unicast functionality is provided by facilities, which also simultaneously provide broadcast and multicast functionalities.

Additionally in accordance with a preferred embodiment of the present invention the broadcast includes transmission of content to all users within a geographical footprint of a broadcast, including transmission of content in a pay access regime.

Further in accordance with a preferred embodiment of the present invention the multicast includes transmission of content to all users within a community having a predefined common interest, within a geographical footprint of a broadcast.

Still further in accordance with a preferred embodiment of the present invention the unicast includes transmission of content to an individual user based on a request from that user.

Further in accordance with a preferred embodiment of the present invention at least one coordinating facility coordinates unicast functionality with at least one of broadcast and multicast functionalities, thereby to enable efficient and effective use of available resources in terms of transmission facilities and bandwidth.

Preferably, the coordinating functionality provides at least one of the following functionalities: shifting between unicasting and multicasting, bandwidth allocation within multicast communities and bandwidth allocation between unicast, multicast and a priori broadcast or multicast content.

Additionally or alternatively the coordinating functionality is operative to determine what content is sent in what manner at what time via which facilities to which users.

Preferably, one coordinating functionality is operative to create new multicast communities in response to an increase in common user interests and requests.

Further in accordance with a preferred embodiment of the present invention the one coordinating functionality is operative to eliminate multicast communities in response to a decrease in common user interests and requests.

Preferably, as a community grows, the amount of bandwidth allocated to that community increases. Additionally, as a community decreases in size, the amount of bandwidth allocated to that community decreases.

Additionally or alternatively, there is defined a minimum multicast threshold which is a relative threshold determined by relative demands for various available content.

Preferably, the system provides a guaranteed minimum level of unicast service to the extent required and wherein bandwidth remaining from the provision of the guaranteed minimum level of unicast service is employed for multicast, the same broadcast network providing both unicast and multicast.

Still further in accordance with a preferred embodiment of the present invention the bandwidth not required for contractual unicast service is allocated to multicast, thereby reducing demand for contractual unicast service and thus, over time, decreasing latency and providing enhanced service to customers.

Additionally in accordance with a preferred embodiment of the present invention the bandwidth not required for contractual unicast service is allocated not only to multicast but also to better unicast service, in accordance with latency considerations.

Further in accordance with a preferred embodiment of the present invention the available bandwidth is allocated with the highest priority being given to a-priori content and the next highest priority being given to unicast the remaining bandwidth being employed for multicast.

Preferably, the remaining bandwidth is allocated among communities based at least partially on relative community size.

There is provided in accordance with another preferred embodiment of the present invention a method for providing content to user. The method includes the steps of multicasting content to multiple users by pushing content relating to individual communities and allocating bandwidth among the individual communities.

There is also provided in accordance with a further preferred embodiment of the present invention a method for providing content to users. The method includes the steps of multicasting content to multiple users, unicasting content to individual users and allocating bandwidth between the multicasting and the unicasting.

There is further provided in accordance with a preferred embodiment of the present invention a method for providing content to users. The method includes multicasting content to multiple users by pushing to each of a plurality or user communities, content relating to the community based on at least a priori determinations and current demand and allocating bandwidth among at least content based on a priori determinations and content based on current demand.

There is also provided in accordance with yet a further preferred embodiment of the present invention a method for providing unicast and multicast content to users and including bandwidth allocation wherein bandwidth remaining from the provision of the guaranteed minimum level of unicast service is employed for multicast, the same broadcast network providing both unicast and multicast.

There is further provided in accordance with yet another preferred embodiment of the present invention a method for providing unicast and multicast content to users. The method includes bandwidth allocation, allocating highest priority to a-priori content and next highest priority to unicast and for allocating remaining bandwidth to multicast.

Additionally in accordance with a preferred embodinient of the present invention the method also includes the broadcast of content to all users within a geographical footprint of a broadcast, including transmission of content in a pay access regime.

Still further in accordance with a preferred embodiment of the present invention the step of multicasting includes transmission of content to all users within a community having a predefined common interest, within a geographical footprint of a broadcast.

Further in accordance with a preferred embodiment of the present invention the step of unicasting includes transmission of content to an individual nser based on a request from that user.

Moreover in accordance with a preferred embodiment of the present invention at least one coordinating facility coordinates unicast functionality with at least one of broadcast and multicast functionalities, thereby to enable efficient and effective use of available resources in terms of transmission facilities and bandwidth.

Preferably, the coordinating functionality provides at least one of the following functionalities: shifting between unicasting and multicasting, bandwidth allocation within multicast communities and bandwidth allocation between unicast, multicast and a priori broadcast or multicast content.

Additionally or alternatively, the coordinating functionality is operative to what content is sent in what manner at what time facilities to which users.

Further in accordance with a preferred embodiment of the present invention the coordinating functionality is operative to create new multicast communities in response to an increase in common user interests and requests.

Additionally in accordance with a preferred embodiment of the present invention the coordinating functionality is operative to eliminate multicast communities in response to a decrease in common user interests and requests.

Further in accordance with a preferred embodiment of the present invention, as a community grows, the amount of bandwidth allocated to that community increases.

Additionally or alternatively, as a community decreases in size, the amount of bandwidth allocated to that community decreases.

Still further in accordance with a preferred embodiment of the present invention the method also includes the step of providing a guaranteed minimum level of unicast service to the extent required and wherein bandwidth remaining from the provision of the guaranteed minimum level of unicast service is employed for multicast, the same broadcast network providing both unicast and multicast.

Further in accordance with a preferred embodiment of the present invention, the bandwidth not required for contractual unicast service is allocated to multicast, thereby reducing demand for contractual unicast service and thus, over time, decreasing latency and providing enhanced service to customers.

Preferably, the bandwidth not required for contractual unicast service is allocated not only to multicast but also to better unicast service, in accordance with latency considerations.

Additionally or alternatively, the available bandwidth is allocated with the highest priority being given to a-priori content and the next highest priority being given to unicast, the remaining bandwidth employed being for multicast.

Preferably, the remaining bandwidth is allocated among communities based at least partially on relative community size.

BRIEF DESCRIPTION OF THE DRAWINGS

The present invention will be understood and appreciated more fully from the following detailed description, taken in conjunction with the drawings in which:

FIGS. 2A, 2B & 2C are illustrations of three typical operative states of an integrated multicast/unicast system and methodology of the type shown in FIG. 1 illustrating shifts between unicasting and multicasting;

FIG. 6C is a diagram showing changes in bandwidth allocation over time in accordance with another preferred embodiment of the present invention;

FIG. 6D is a diagram showing changes in bandwidth allocation over time in accordance with yet another preferred embodiment of the present invention;

FIG. 6E is a diagram showing changes in bandwidth allocation over time in accordance with still another preferred embodiment of the present invention;

FIGS. 7A, 7B and 7C are simplified functional block diagrams illustrating three alternative functionalities of the system shown in FIG. 1;

FIGS. 9A/1, 9A/2, 9B/1 and 9B/2 are simplified flow diagrams corresponding respectively to the simplified functional block diagrams of FIGS. 8A and 8B;

FIGS. 10A and 10B are simplified functional block diagrams illustrating two alternative realizations of the functionality described in FIGS. 4A & 4B and FIG. 7B;

FIGS. 11A/1, 11A/2, 11B/1 and 11B/2 are simplified flow diagrams corresponding respectively to the simplified functional block diagrams of FIGS. 10A and 10B;

FIGS. 13A/1, 13A/2, 13B/1 and 13B/2 are simplified flow diagrams corresponding respectively to the simplified functional block diagrams of FIGS. 12A and 12B;

DETAILED DESCRIPTION OF PREFERRED EMBODIMENTS

Figure 1:
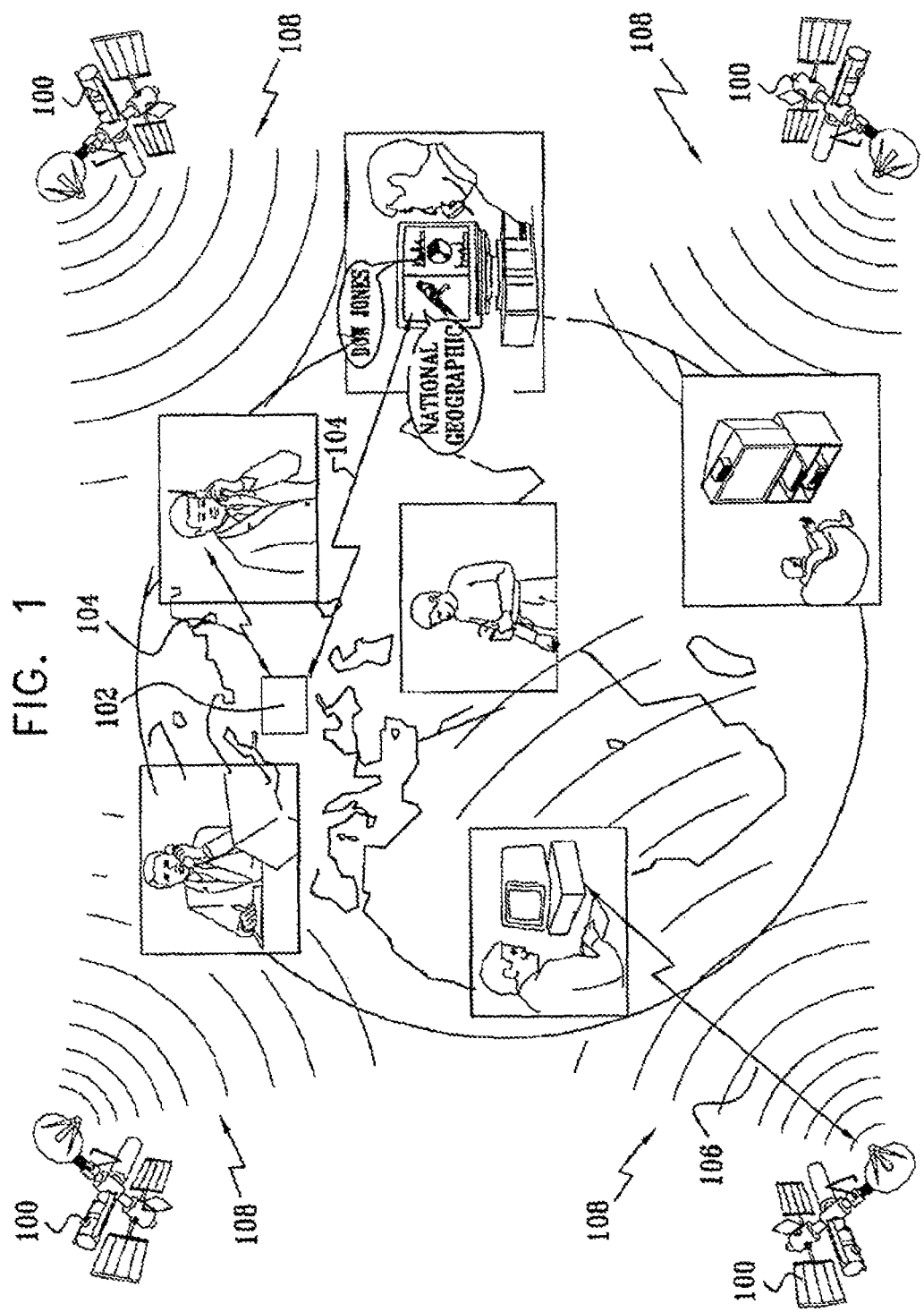
FIG. 1 is a simplified and generalized pictorial illustration of an integrated multicast/unicast system and methodology for providing content to users via electronic media.

Reference is now made to FIG. 1, which is a simplified and generalized pictorial illustration of an integrated multicast/unicast system and methodology for providing content to users via electronic media.

As seen in FIG. 1 there is provided an integrated multicast/unicast system which typically includes a plurality of satellites 100 which have at least one and preferably all of the following functionalities: broadcast, multicast and unicast. Broadcast, multicast and unicast functionalities may also be provided by cable networks, digital terrestrial networks, microwave networks, cellular networks and DSL networks, as well as any other broadband facilities. Unicast functionality may additionally be provided by PSTN facilities.

It is appreciated that unicast functionality may or may not be provided by facilities, which also simultaneously provide broadcast and multicast functionalities.

Throughout, the following definitions are employed:

BROADCAST—transmission of content to all users within geographical footprint of a broadcast, including transmission of content in a pay access regime;

MULTICAST—transmission of content to all users within a community having a predefined common interest, within a geographical footprint of a broadcast;

UNICAST—transmission of content to an individual user based on a request from that user, including, for example, HTTP or FTP.

In accordance with a preferred embodiment of the present invention, one or more coordinating facilities, symbolized by a block 102, coordinate the unicast functionality with at least one and preferably both of the broadcast and multicast functionalities, thereby to enable most efficient and effective use of available resources in terms of transmission facilities and bandwidth. This coordination, as will be described hereinbelow in detail, may take the form of shifting between unicasting and multicasting and is described hereinbelow with respect to FIGS. 2A, 2B and 2C, bandwidth allocation within multicast communities, as described hereinbelow with respect to FIGS. 3A, 3B and 3C, bandwidth allocation between unicast, multicast and a priori broadcast or multicast content, other tradeoffs and various combinations and subcombinations of the foregoing.

Coordinating facilities 102 preferably determine what content is sent in what manner at what time via which facilities to which users. For example, coordinating facilities 102 govern terrestrial unicast transmissions, symbolized by arrows 104, satellite unicast transmissions, symbolized by an arrow 106 and satellite broadcasts and multicasts symbolized by footprints 108.

Figure 2A:
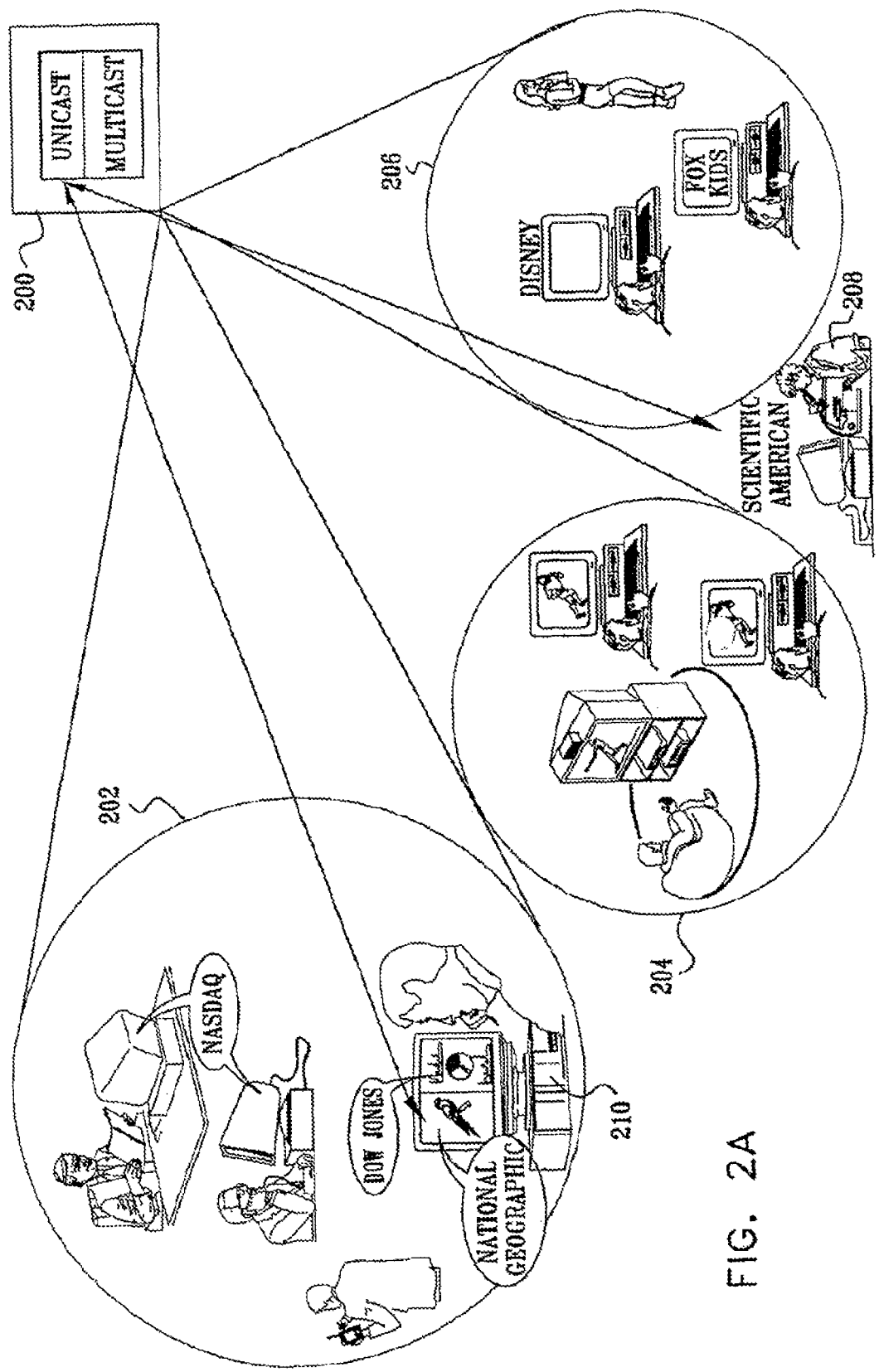
Figure 2B:
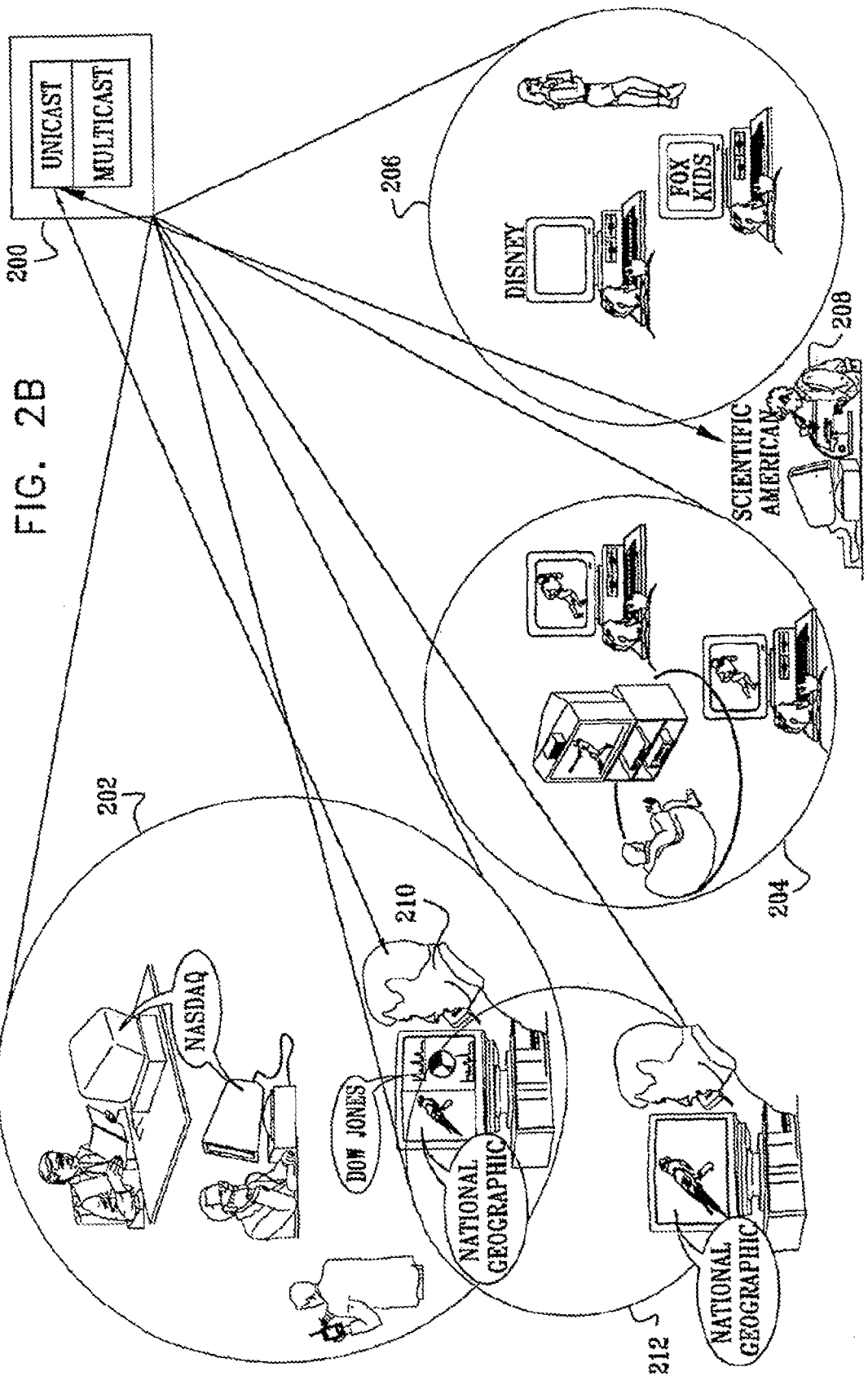

Reference is now made to FIGS. 2A, 2B & 2C, which are illustrations of three typical operative states of an integrated multicast/unicast system and methodology of the type shown in FIG. 1 illustrating shifts between unicasting and multicasting.

FIG. 2A shows multicasting from a coordinating center 200 to a plurality of multicast communities, typically including a business multicast community 202, a sports multicast community 204 and a youth multicast community 206. The symbolism employed in FIGS. 2A-2C indicates the size of the community by the number of individuals shown therewithin.

FIG. 2A also shows a user 208 who receives science content via a unicast and also a user 210, who is a member of the business multicast community 202, who also receives nature content via a unicast.

A comparison of FIG. 2B with FIG. 2A shows the creation of a new nature multicast community 212, which may overlap with another multicast community, such as the business multicast community 202, to indicate that a user may belong to multiple multicast communities simultaneously.

It is appreciated that new communities are created in response to an increase in common user interests and requests. Thus, as symbolized by an additional user having nature interests in FIG. 2B, when the number of users expressing a common interest reaches an appropriate threshold, a new multicast community may be automatically created in accordance with the present invention.

FIG. 2C shows an opposite trend from that illustrated in FIG. 2B wherein due to a decrease in common user interests and requests, multicast communities are eliminated. Thus, as symbolized by removal of a user previously having sports interests, designated by reference numeral 214 in FIG. 2C, causing the number of users expressing a common interest in sports to fall below an appropriate threshold, the sports community 204 appearing in FIG. 2A is automatically eliminated in accordance with the present invention as shown in FIG. 2C.

Figure 3A:
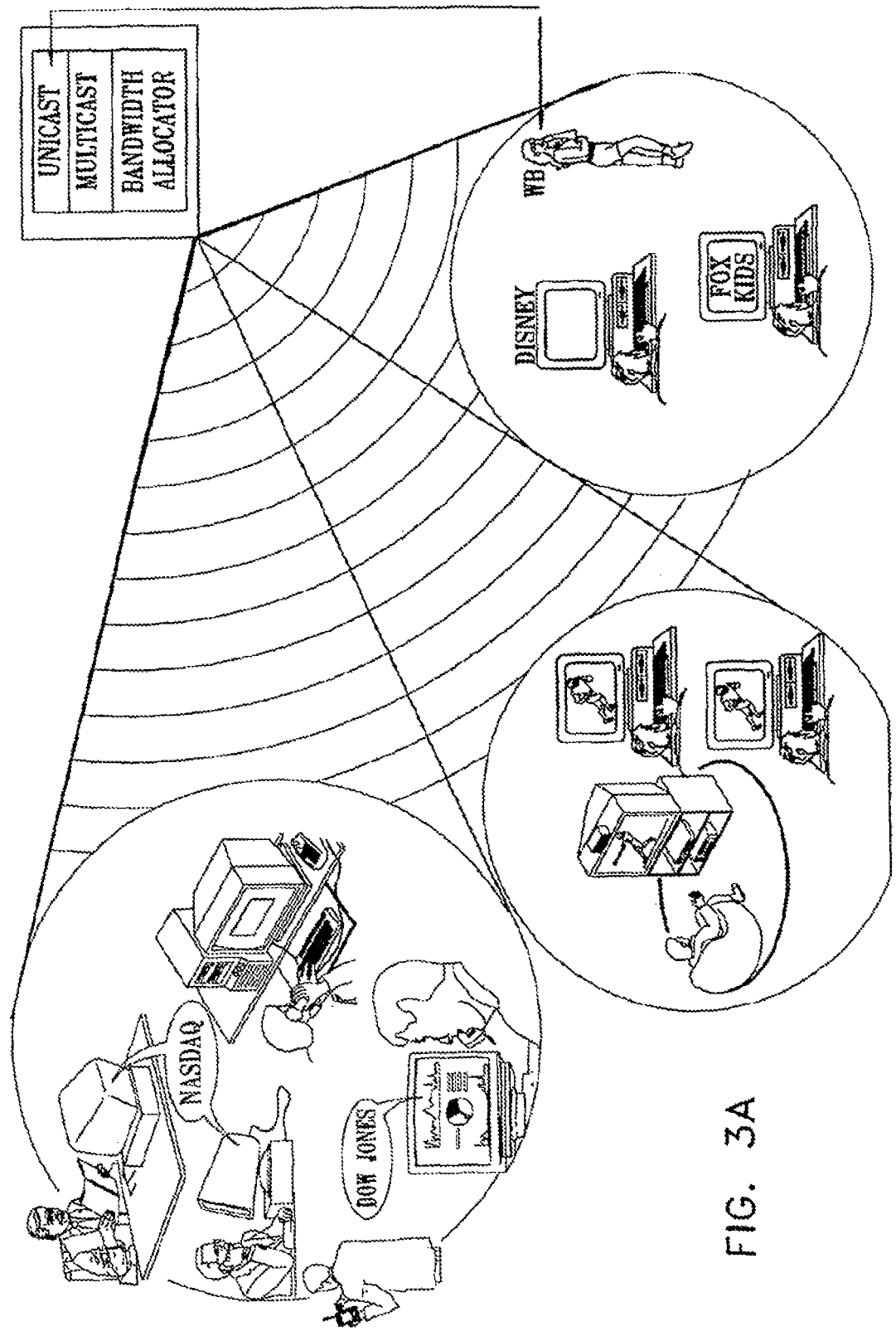
FIGS. 3A, 3B & 3C are illustrations of three typical operative states of an integrated multicast/unicast system and methodology of the type shown in FIG. 1 illustrating bandwidth allocation among and within communities.
Figure 3B:
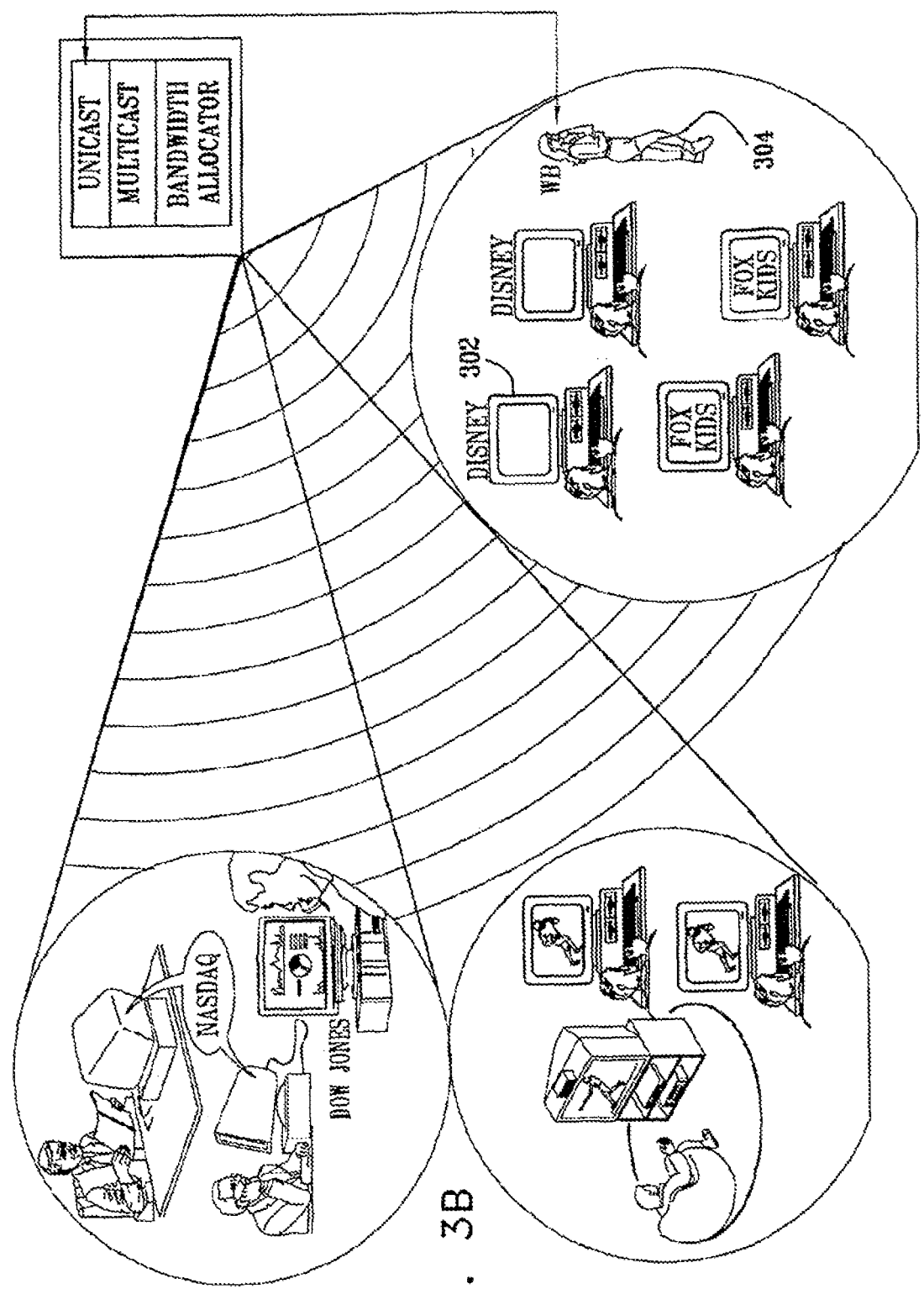
Figure 3C:
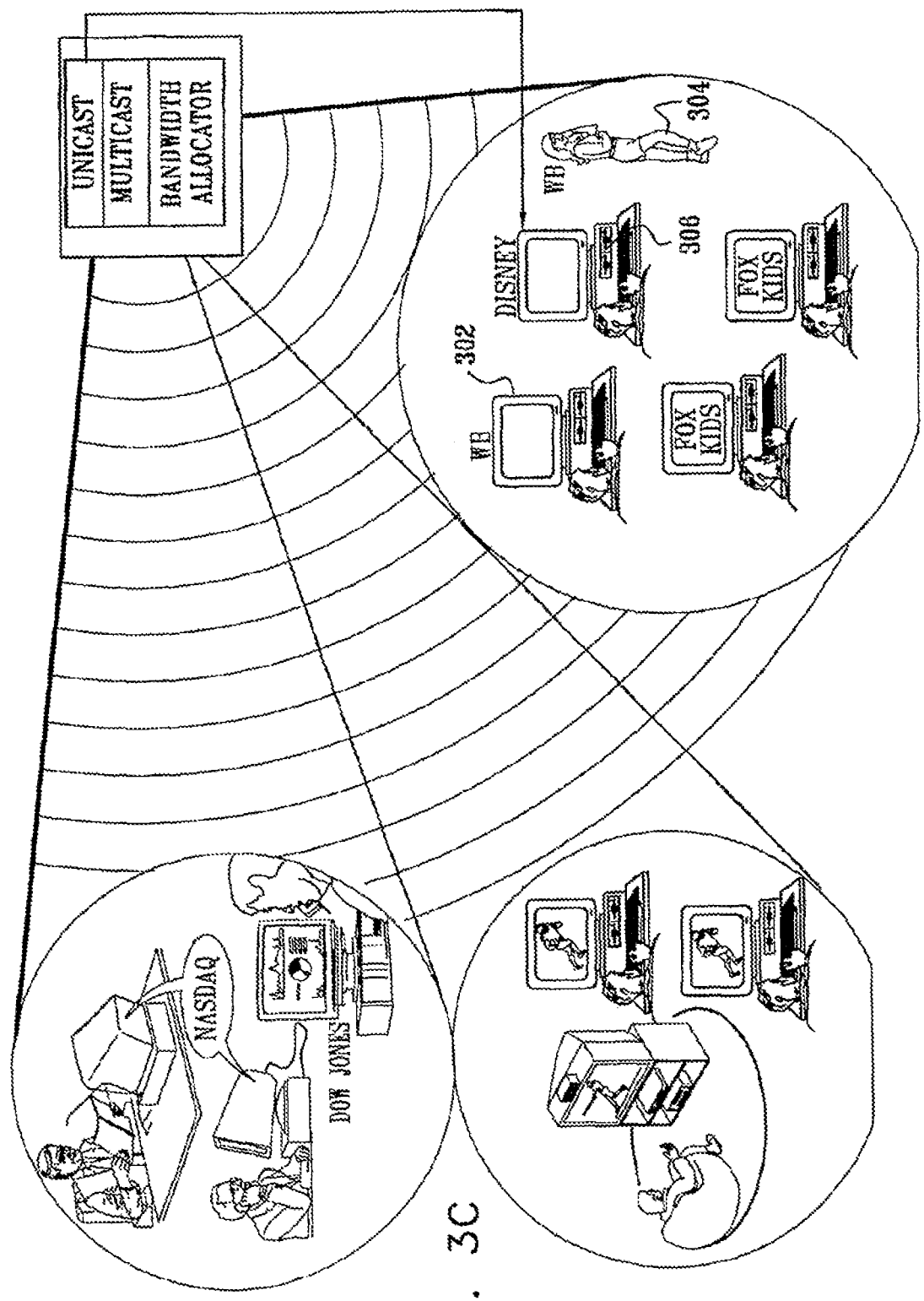

Reference is now made to FIGS. 3A, 3B & 3C, which are illustrations of three typical operative states of an integrated multicast/unicast system and methodology of the type shown in FIG. 1 illustrating bandwidth allocation among and within communities.

As seen in FIGS. 3A and 3B, as a community grows, here indicated symbolically by the number of individuals located with a circle representing the community, the amount of bandwidth allocated to that community, here indicated symbolically by the radius of the circle, increases. Concomitantly, as a community decreases in size, the amount of bandwidth allocated to that community decreases. An increase in the size of the community and thus in the bandwidth allocation thereto is exemplified by the youth community at the right of FIGS. 3A and 3B. A decrease in the size of the community is exemplified by the business community at the left of FIGS. 3A and 3B.

A comparison of FIGS. 3B and 3C illustrates typical bandwidth allocation within a community. It is seen that a symbolic member of the community, indicated by reference numeral 302, who was receiving Disney in FIG. 3B, shifts to Warner Bros. in FIG. 3C. This, when statistically significant, results in a reallocation of bandwidth between Disney and Warner Bros. in FIG. 3C. In this case, whereas Warner Bros. was unicast in FIG. 3B to a symbolic member of the community, indicated by reference numeral 304, the increased demand for Warner Bros. in FIG. 3C passes a minimum multicast threshold and causes Warner Bros. to be multicast in FIG. 3C. Concomitantly, the decreased demand for Disney causes Disney, which was multicast in FIG. 3B to be unicast to a symbolic member of the community 306 in FIG. 3C.

It is appreciated that the minimum multicast threshold is typically not an absolute threshold but rather a relative threshold determined by relative demands for various available content.

It is appreciated that in the embodiment of FIGS. 3A-3C unicast bandwidth is not provided by the broadcast network and does not employ its bandwidth.

Figure 4A:
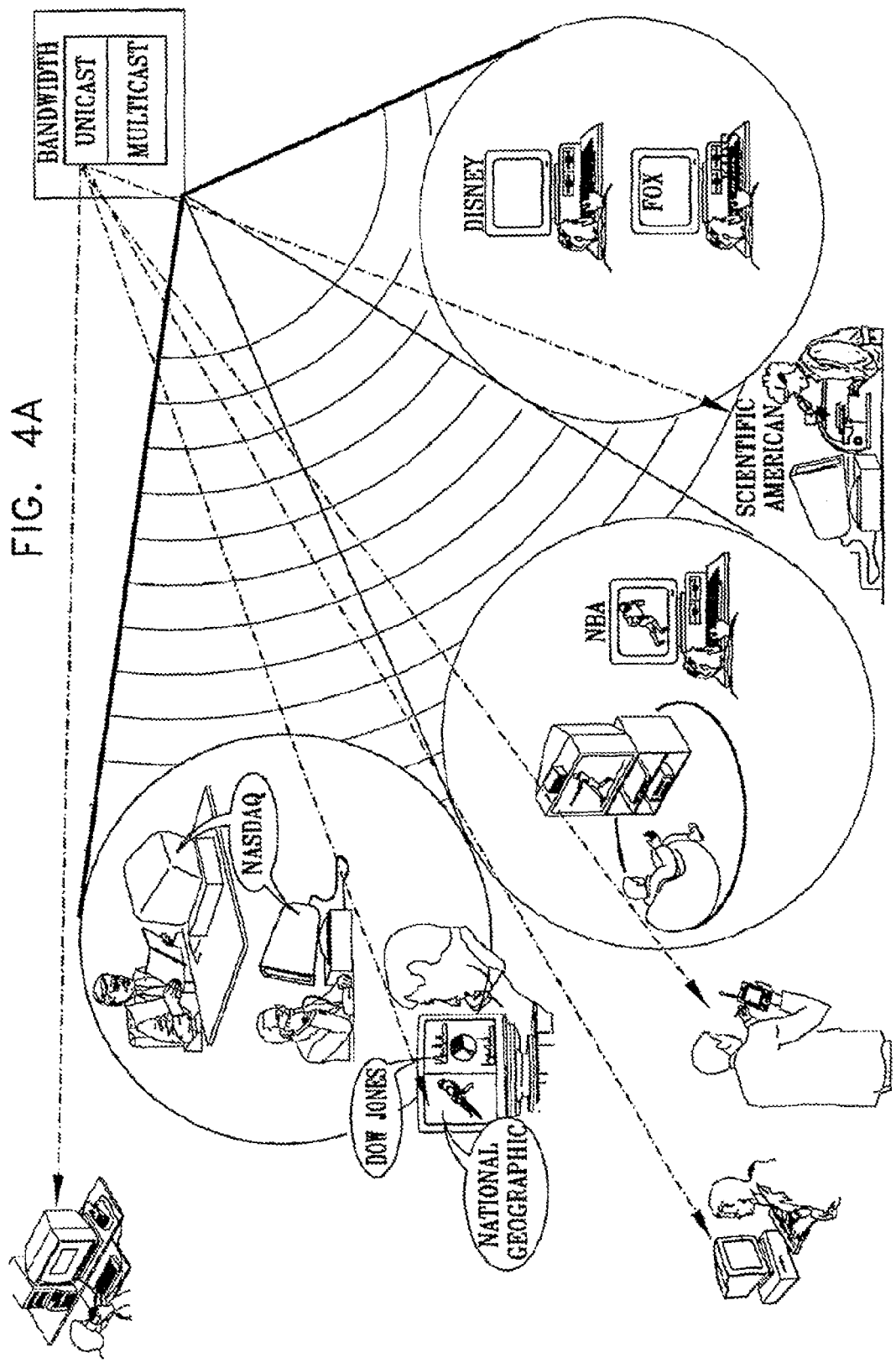
FIGS. 4A, 4B & 4C are illustrations of three typical operative states of an integrated multicast/unicast system and methodology of the type shown in FIG. 1 illustrating bandwidth allocation between unicast, multicast and a priori content.
Figure 4B:
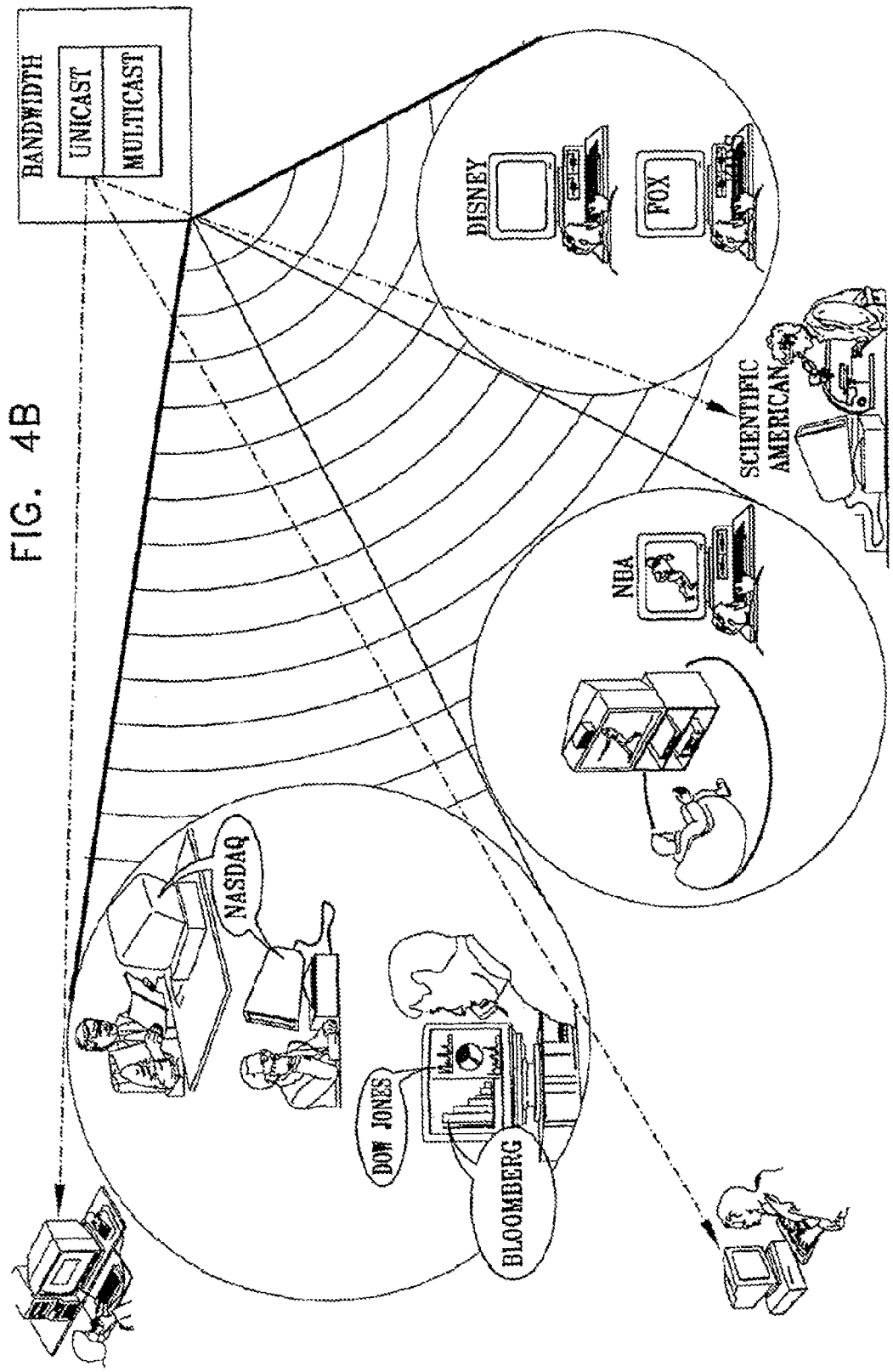
Figure 4C:
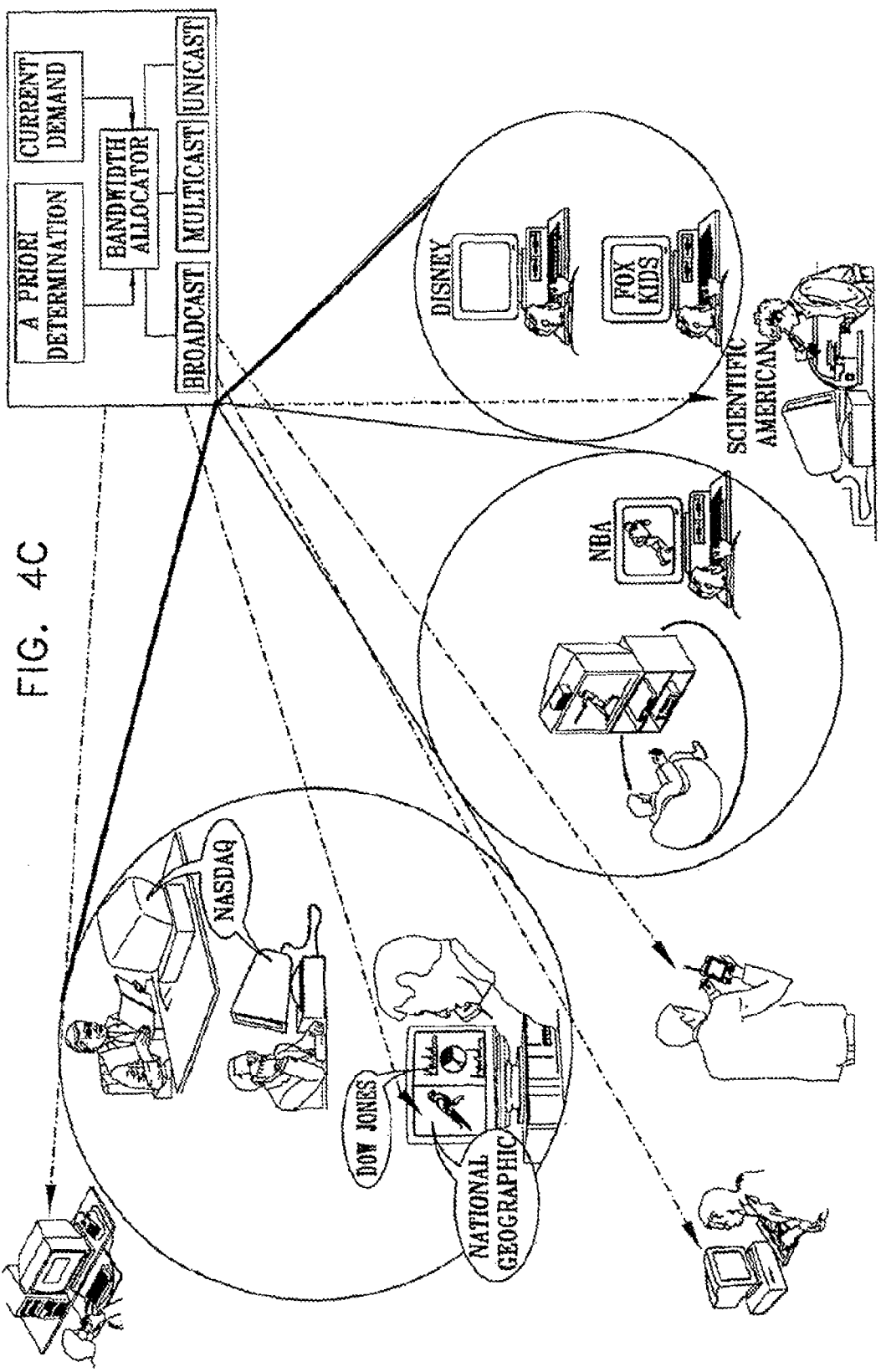

Reference is now made to FIGS. 4A, 4B & 4C, which are illustrations of three typical operative states of an integrated multicast/unicast system and methodology of the type shown in FIG. 1 illustrating bandwidth allocation between unicast, multicast and a priori content. In the embodiment of FIGS. 4A-4C, as contrasted with that of FIGS. 3A-3C, there is provided a guaranteed minimum level of unicast service to the extent required. Bandwidth remaining from the provision of the guaranteed minimum level of unicast service is employed for multicast. It is assumed that the same broadcast network provides both unicast and multicast, which is quite common in cable and DSL service.

Considering FIGS. 4A and 4B, it is seen that the amount of unicast demand decreases from FIG. 4A to FIG. 4B. This increases the amount of bandwidth available for multicast. As seen in FIG. 4B, typically the business community takes up this added bandwidth inasmuch as Bloomberg, a business service, is now multicast.

Figure 5A:
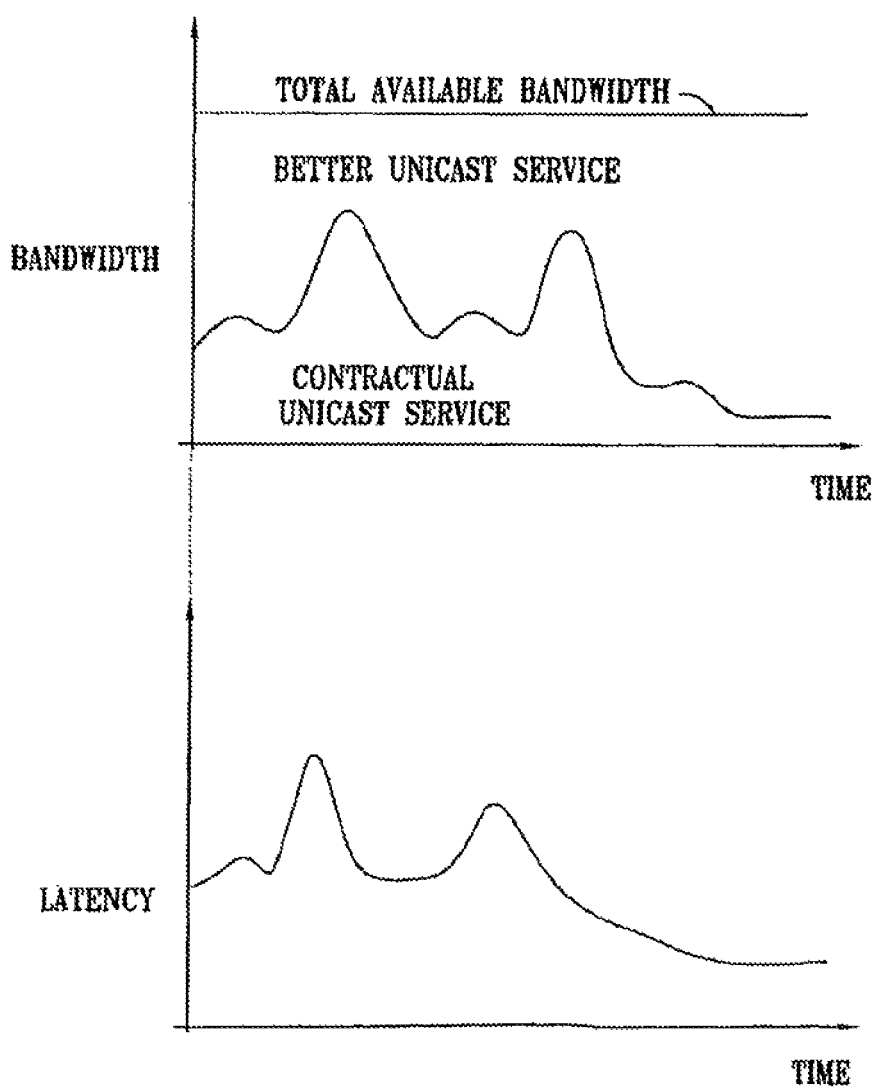
FIG. 5A is a set of diagrams showing changes in bandwidth allocation and latency over time in accordance with the prior art.

In this context, reference is also made to FIG. 5A, which shows dynamic allocation over time of available bandwidth between contractual unicast service and better unicast service in accordance with the prior art. It is seen that in the prior art, generally the greater the percentage of contractual unicast service, the greater the resulting latency. Thus better service, i.e. lower latency results from lowered demands for contractual unicast service.

In accordance with the present invention, as exemplified by FIG. 5B, bandwidth not required for contractual unicast service is allocated to multicast, as described hereinabove with reference to FIGS. 4A and 4B. The availability of multicast service reduces the demand for contractual unicast service and thus, over time, the latency decreases, providing enhanced service to customers. It is noted particularly that the availability of multicast service inherently reduces latency since content is pushed to and cached at the customer and thus can be retrieved instantaneously.

Figure 5B:
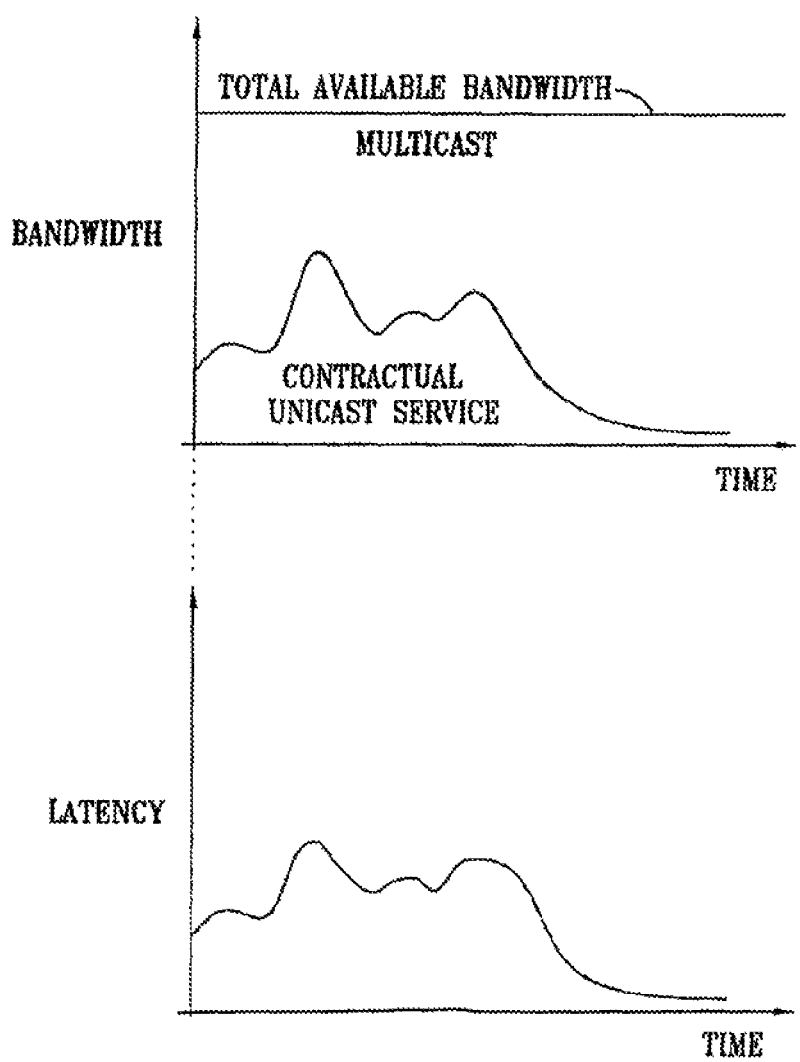
FIG. 5B is a set of diagrams showing changes in bandwidth allocation and latency over time in accordance with one preferred embodiment of the present invention.
Figure 5C:
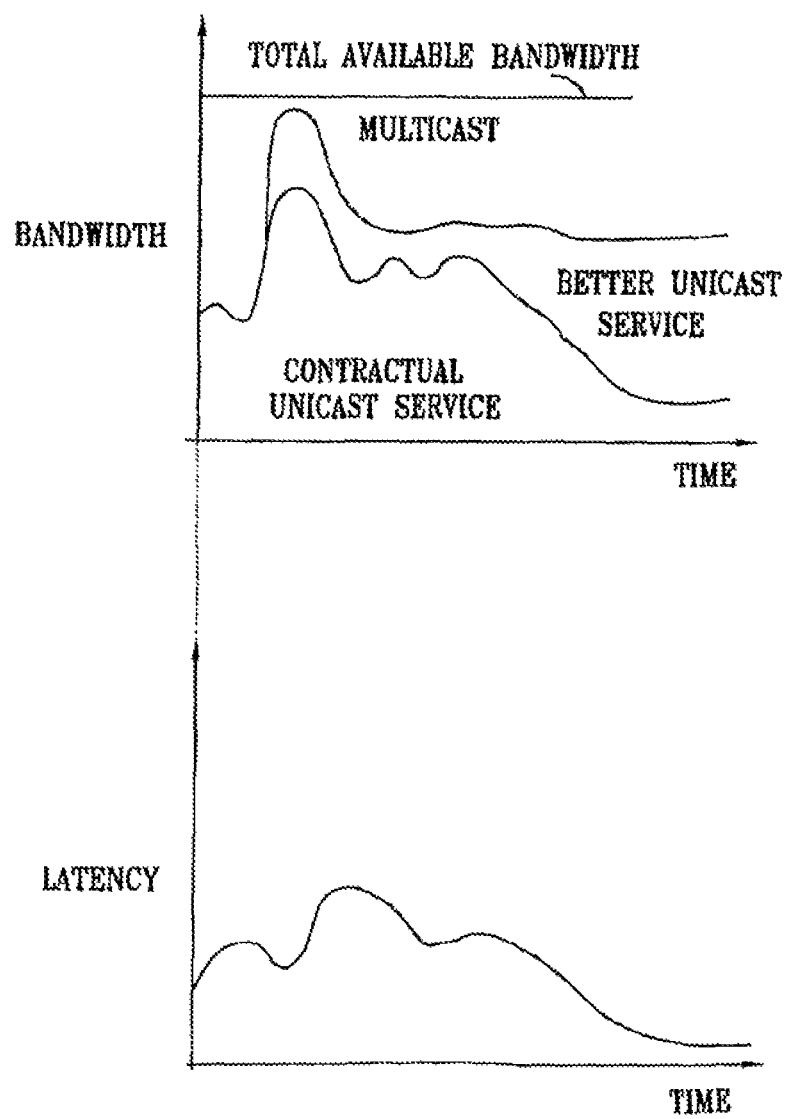
FIG. 5C is a set of diagrams showing changes in bandwidth allocation and latency over time in accordance with another preferred embodiment of the present invention.

FIG. 5C illustrates a further enhancement of the invention described hereinabove with reference to FIGS. 4A and 4B. In FIG. 5C, bandwidth left over from contractual unicast service is allocated not only to multicast but also, in certain cases to better unicast service. Typically a determination whether to allocate the left over bandwidth to multicast or to better unicast service is made based on exceedance of a minimum multicast threshold, which is preferably absolute but may be determined by relative demands for content.

It is appreciated that the scenario of FIG. 5C is typically one wherein there is available sufficient bandwidth for all required content and the allocation of the remaining bandwidth is made purely or principally based on latency considerations, predicated on the understanding that lower latency is translated into increased customer satisfaction.

It may thus be appreciated from a comparison of the latency shown in FIGS. 5B and 5C, that the enhancement of FIG. 5C produces an overall decrease in latency over time.

FIG. 4C shows a somewhat more complex situation than that shown in FIG. 4A, wherein there also exists an a-priori commitment to broadcast or multicast a certain amount of content determined by a contractual arrangement with a content provider. In such a case the available bandwidth is allocated with the highest priority being given to the a-priori content and the next highest priority being given to unicast. The remaining bandwidth is employed for multicast and is allocated among and within communities typically in a manner similar to that described hereinabove with reference to FIGS. 1A-3C.

Figure 6A:
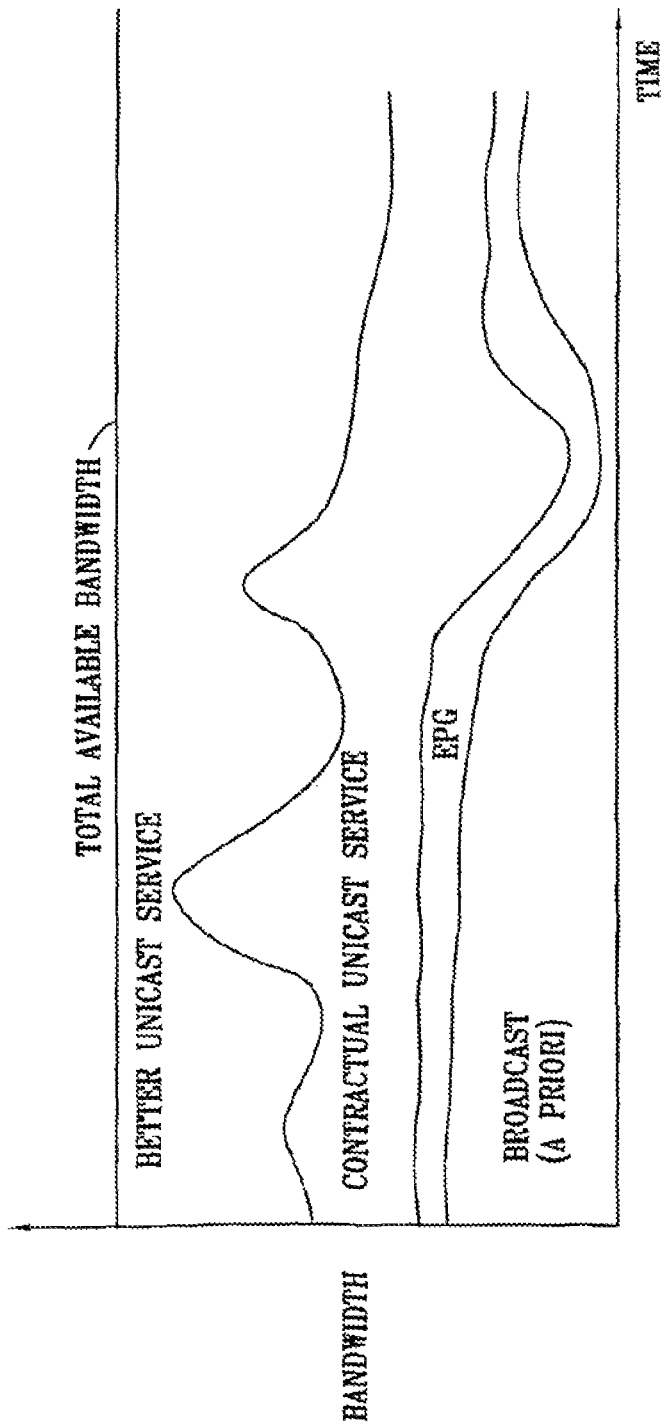
FIG. 6A is a diagram showing changes in bandwidth allocation over time in accordance with the prior art.

In this context, reference is also made to FIG. 6A, which shows dynamic allocation over time of available bandwidth between a priori broadcast or multicast, typically including EPG (Electronic Program Guide), contractual unicast service and better unicast service in accordance with the prior art.

Figure 6B:
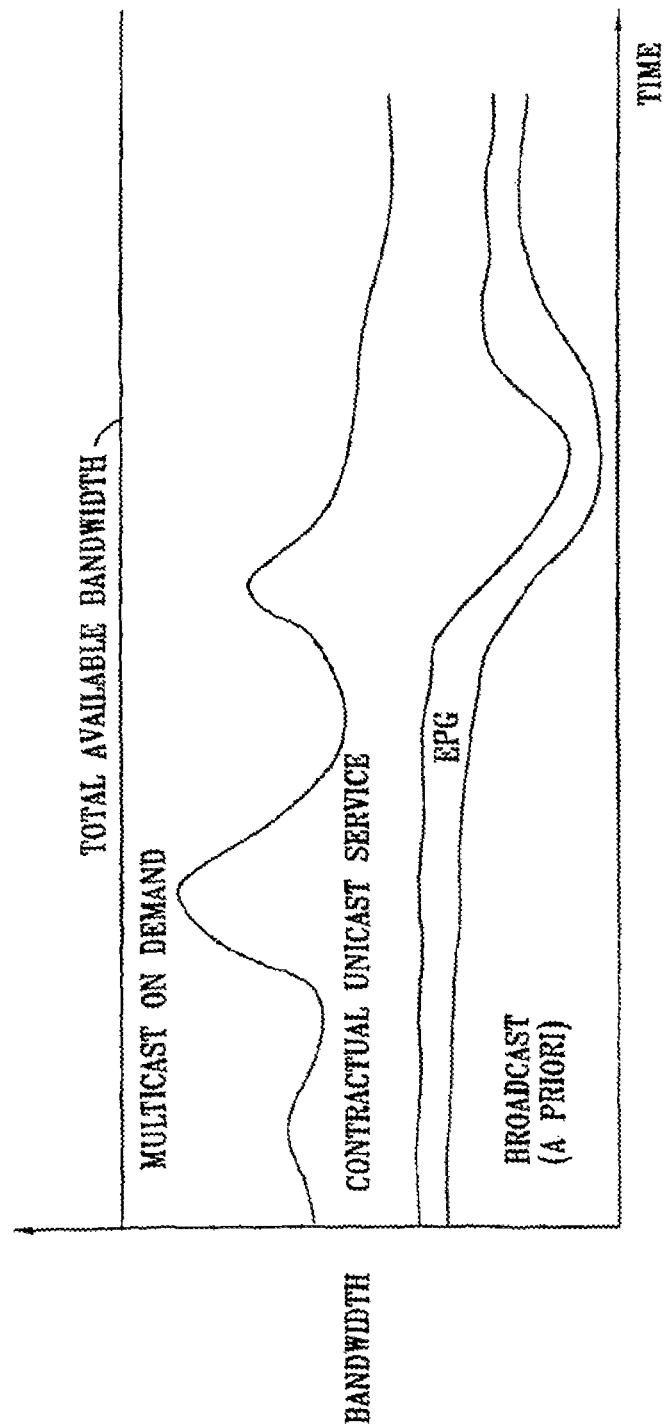
FIG. 6B is a diagram showing changes in bandwidth allocation over time in accordance with one preferred embodiment of the present invention.

FIG. 6B shows dynamic allocation over time of available bandwidth between a priori broadcast or multicast, typically including EPG (Electronic Program Guide), contractual unicast service and multicast on demand in accordance with the present invention.

FIG. 6C shows dynamic allocation over time of available bandwidth between a priori broadcast or multicast, typically including EPG (Electronic Program Guide), contractual unicast service, better unicast service and multicast on demand in accordance with the present invention.

FIG. 6D shows dynamic allocation over time of available bandwidth between a priori broadcast or multicast, which is now divided into required content and nice to have content and typically includes EPG (Electronic Program Guide), contractual unicast service, better unicast service and multicast on demand in accordance with the present invention.

FIG. 6E shows dynamic allocation over time of available bandwidth to between a priori broadcast or multicast, which is now divided into required content and nice to have content and typically includes EPG (Electronic Program Guide), contractual unicast service, better unicast service and multicast on demand in accordance with the present invention. The difference between FIG. 6E and FIG. 6D is the allocation to multicast of some of the bandwidth, which is used for nice to have content.

Figure 7A:
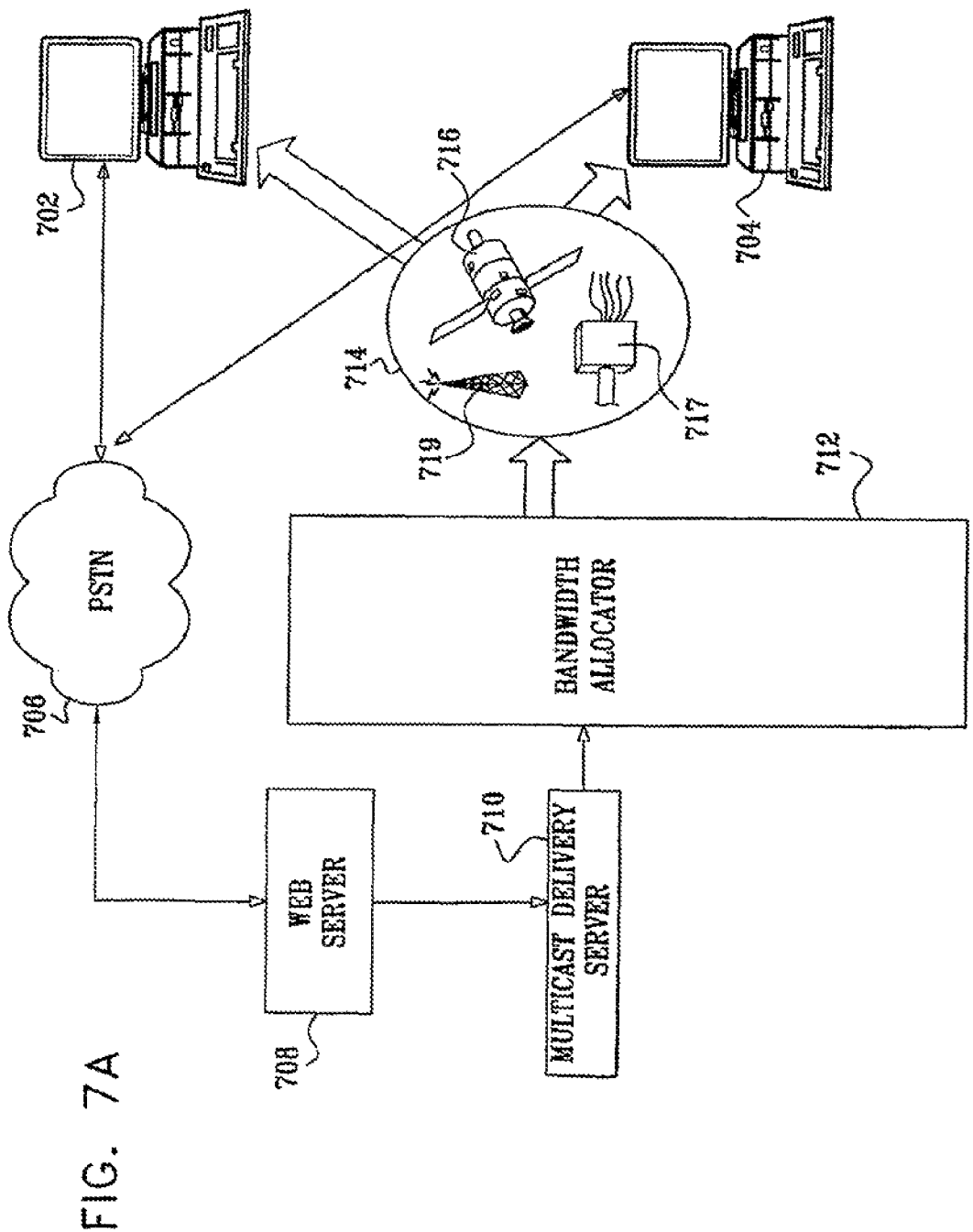
Figure 7B:
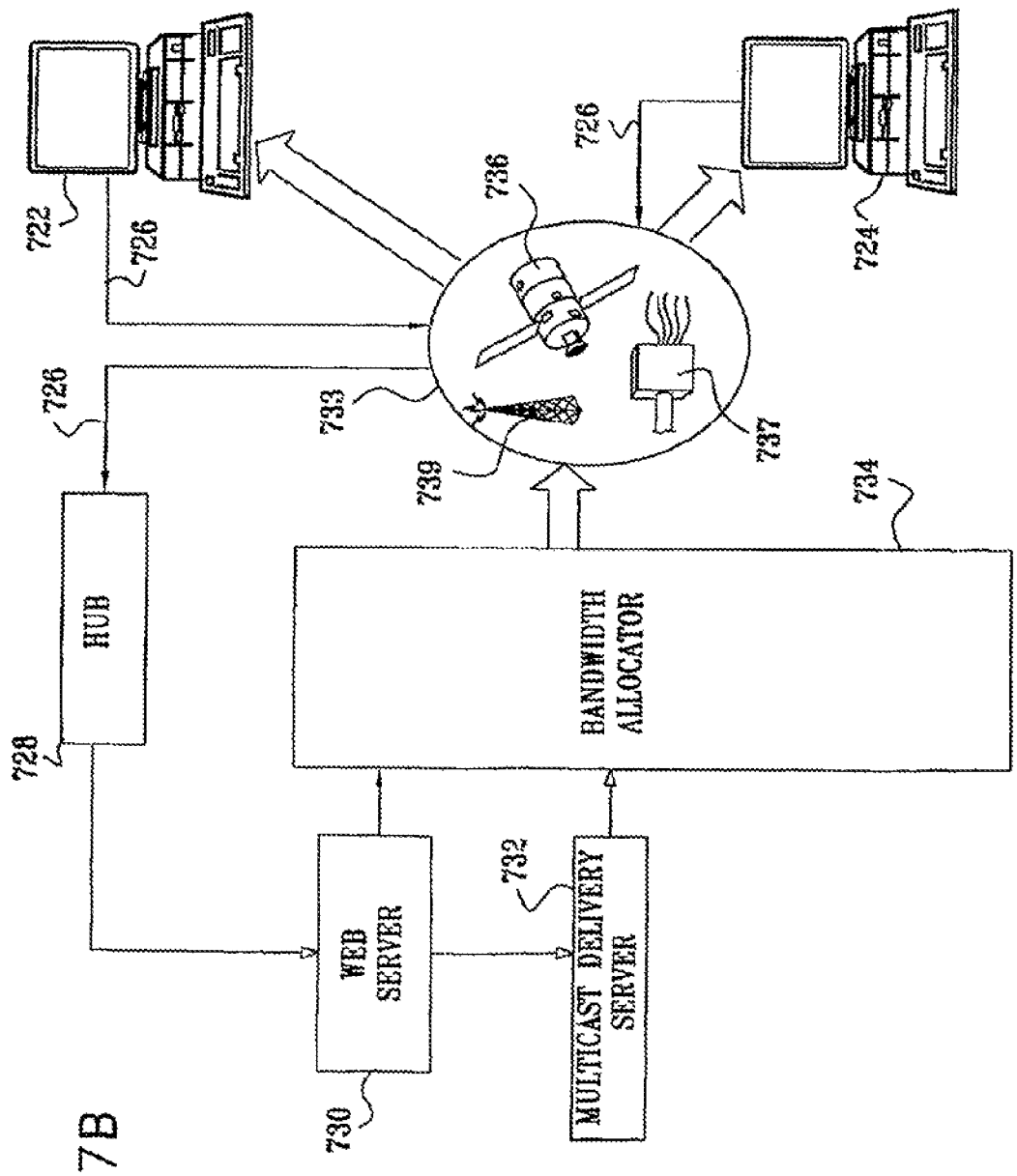

Reference is now made to FIGS. 7A, 7B and 7C, which are simplified functional block diagrams illustrating three alternative functionalities of the system shown in FIG. 1 employing asymmetric networks including non-balanced forward and return paths, wherein the forward path has substantially greater bandwidth than the return path.

FIG. 7A provides functionality suitable for use in the systems shown in FIGS. 3A-3C. FIG. 7B provides functionality suitable for use in the systems shown in FIGS. 4A & 4B and FIG. 7C provides functionality suitable for use in the system shown in FIG. 4C.

As seen in FIG. 7A, typically first and second end users 702 and 704 are enabled to surf the Internet using a conventional PSTN network 706, which defines a two-way return path. In the course of surfing the Internet, one or more of the end users may communicate with a web server 708, which may be a conventional web server.

In accordance with a preferred embodiment of the present invention, the web server 708 may cause a multicast delivery server 710 to transmit web content via a bandwidth allocator 712, which typically includes bandwidth allocation decision functionality, a multiplexer and a modulator. Bandwidth allocator 712 preferably transmits content received from multicast delivery server 710 via a broadband forward path 714, typically including one or more satellites 716 to the first and second end users 702 and 704, to the extent of available allocated bandwidth of the one or more satellites 716. Additionally or alternatively bandwidth allocator 712 may transmit over any suitable forward path, including a broadcast network such as a cable network 717, a digital terrestrial network 719 or an ADSL network (not shown).

Referring now to FIG. 7B, it is seen that typically first and second end users 722 and 724 are enabled to surf the Internet via a forward path and a return path. The return path, is a one-way, typically out of band, return path via an asymmetric network, such as a VSAT network, a DOCSIS cable network or an ADSL network. The forward path employs the same network that is used for the return path, in distinction to the structure of FIG. 7A.

In the embodiment of FIG. 7B, the end users 722 and 724 query over the one-way return path indicated by arrows 726 via a one-way return path hub 728, such as a conventional VSAT hub, a CMTS or a DSLAM. In the course of surfing the Internet, one or more of the end users may communicate with a web server 730, which may be a conventional web server.

In accordance with a preferred embodiment of the present invention, the web server 730 may cause a multicast delivery server 732 to transmit web content via a bandwidth allocator 734, which typically includes bandwidth allocation decision functionality, a multiplexer and a modulator. Bandwidth allocator 734 preferably transmits content received from multicast delivery server 732 via a broadband forward path 733, typically including one or more satellites 736 to the first and second end users 722 and 724, to the extent of available allocated bandwidth of the one or more satellites 736. Additionally or alternatively bandwidth allocator 734 may transmit over any suitable forward path, including a broadcast network such as a cable network 737, a digital terrestrial network 739 or an ADSL network (not shown).

Referring now to FIG. 7C, it is seen that typically first and second end users 752 and 754 are enabled to surf the Internet via a forward path and a return path. The return path, is a one-way, typically out of band, return path via an asymmetric network, such as a VSAT network, a DOCSIS cable network or an ADSL network. The forward path employs the same network that is used for the return path, in distinction to the structure of FIG. 7A.

In the embodiment of FIG. 7C, the end users 752 and 754 query over the one-way return path indicated by arrows 756 via a one-way return path hub 758, such as a conventional VSAT hub, a CMTS or a DSLAM. In the course of surfing the Internet, one or more of the end users may communicate with a web server 760, which may be a conventional web server.

In accordance with a preferred embodiment of the present invention, the web server 760 may cause a multicast delivery server 762 to transmit web content via a bandwidth allocator 764, which typically includes bandwidth allocation decision functionality, a multiplexer and a modulator.

The bandwidth allocator 764 may also concurrently receive content via an a-priori broadcaster server 765 from one or more content providers 766. Bandwidth allocator 764 preferably transmits content received from multicast delivery server 762 and a-priori broadcast server 765 via a broadband forward path 767, typically including one or more satellites 768 to the first and second end users 752 and 754, to the extent of available allocated bandwidth of the one or more satellites 768.

Additionally or alternatively bandwidth allocator 764 may transmit over any suitable forward path, including a broadcast network such as a cable network 769, a digital terrestrial network 770 or an ADSL network (not shown).

It is appreciated that essential differences between the structures shown in FIGS. 7A, 7B and 7C appear in bandwidth allocation decisions. In the embodiment of FIG. 7A, the bandwidth is allocated among various multicast transmissions. In the embodiment of FIG. 7B, the bandwidth is allocated not only between various multicast transmissions but also between various unicast content transmissions. In the embodiment of FIG. 7C, the bandwidth is allocated additionally among a-priori broadcasts.

Figure 8A:
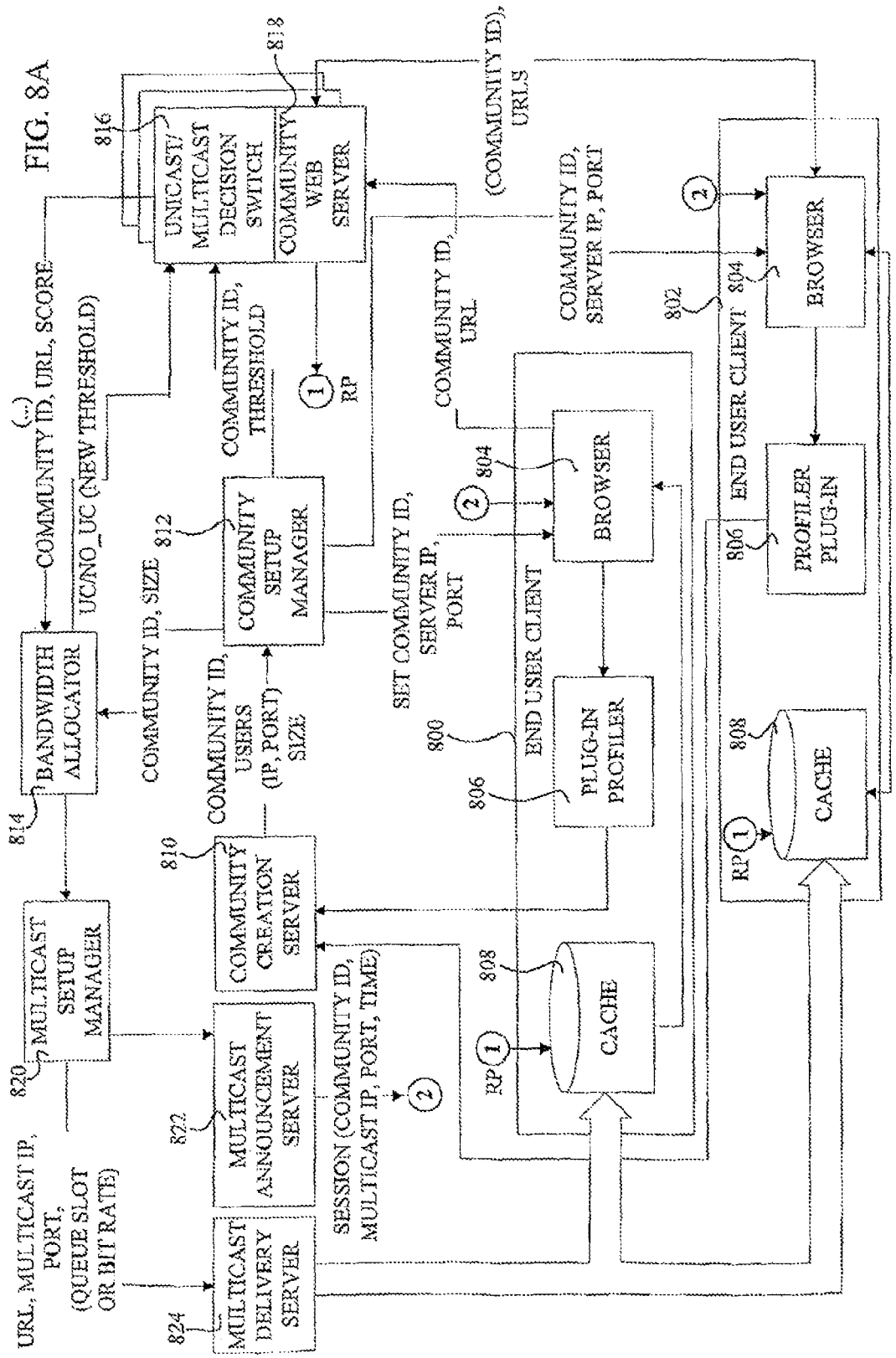
FIGS. 8A and 8B are simplified functional block diagrams illustrating two alternative realizations of the functionality described in FIGS. 3A-3C and FIG. 7A.
Figure 8B:
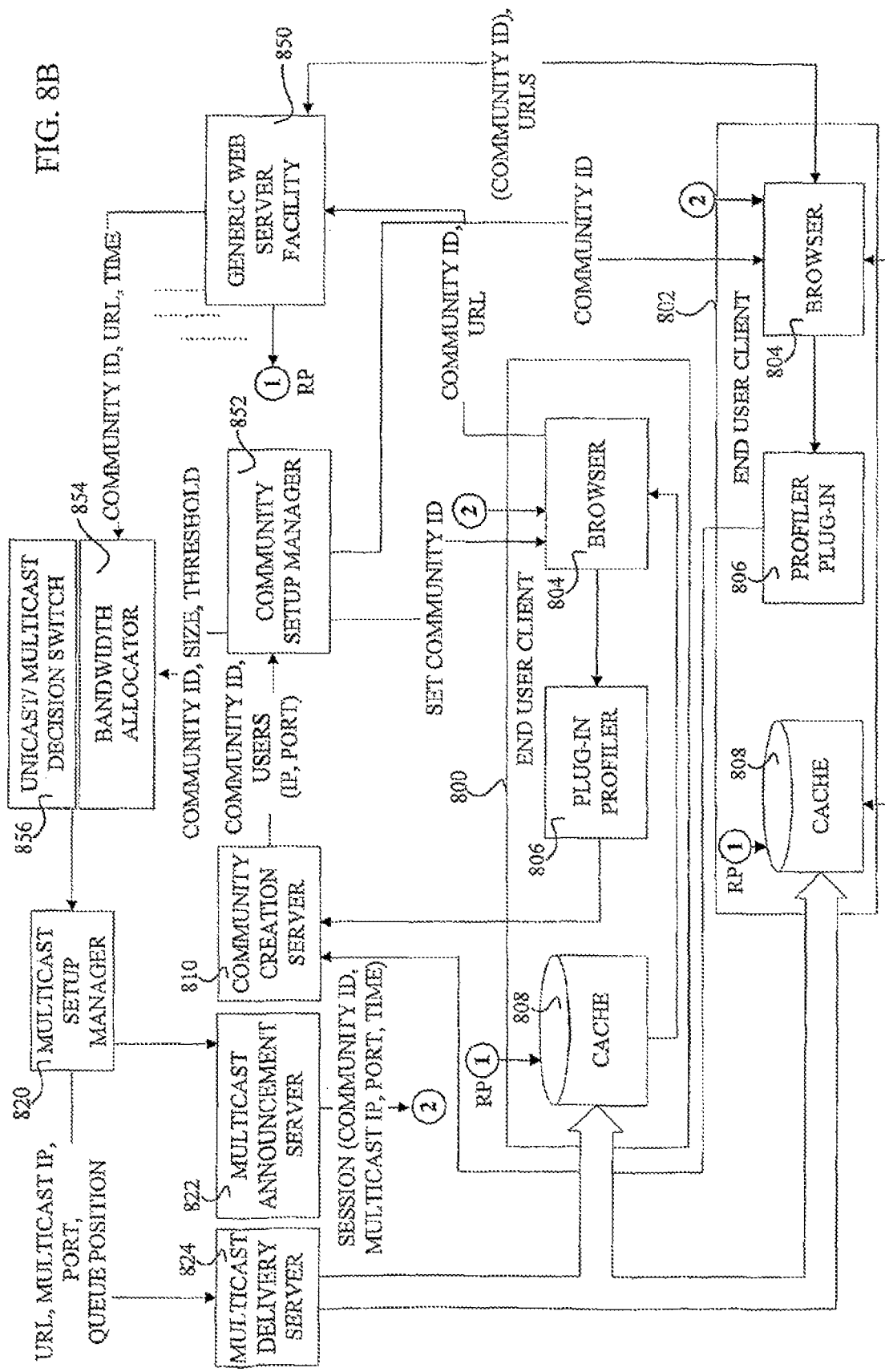

Reference is now made to FIGS. 8A and 8B, which are simplified functional block diagrams illustrating two alternative realizations of the functionality described in FIGS. 3A-3C. Referring initially to FIG. 8A, typically two end-user clients 800 and 802 are shown, it being understood that a multiplicity of such end-user clients employ the system. Each of the end user clients 800 and 802 preferably includes a browser 804 who communicates with a plug-in profiler 806 and with a standard web cache 808.

The standard web cache 808 may be a standard cache such as an MICROSOFT INTERNET EXPLORER cache or alternatively may be an external proxy cache such as an APACHE proxy cache.

The combination of browser 804 and cache 808 is employed for conventional web surfing wherein the browser 804 initially checks cache 808 for requested URLs and only queries a web server, such as the community web server 818, when the requested URL is not in cache or out of date.

Plug-in profiler 806 stores historical surfing information relating to pages requested by the browser 804. Profiler 806 communicates with a community creation server 810 at predetermined times or at times responsive to various possible criteria. The community creation server 810 preferably communicates with all end-user client profilers 806. Community creation server 810 preferably analyzes the client profiles and, on the basis of this analysis, dynamically creates, modifies and deconstructs communities.

The community creation server 810 preferably outputs to a community set-up manager 812, which configures the various end users in accordance with community creation/modification/deconstruction instructions received from server 810. Community set-up manager 812 also interfaces with a bandwidth allocator 814 in order to enable the bandwidth allocator 814 to make appropriate bandwidth allocation determinations.

Community set-up manager 812 also interfaces with a unicast/multicast decision switch 816, which is operative to send content by unicast, until the simultaneous demand for such content justifies sending the content by multicast. Unicast/multicast decision switch 816 is preferably incorporated into a community web server 818.

In accordance with a preferred embodiment of the present invention, each community is served by a single community web server 818 and associated unicast/multicast decision switch 816.

When and so long as simultaneous demand for a given web page exceeds a given threshold, unicast/multicast switch 816 triggers bandwidth allocator 814 to allocate multicast forward path bandwidth for multicast of that web page. Bandwidth allocator 814 may employ a dynamic pre-emptive queue of URLs for such allocation.

In practice, the bandwidth allocator 814 may be responsive to the amount of available bandwidth for dynamically changing the threshold of switch 816.

Bandwidth allocator 814 also interfaces with a multicast set-up manager 820 which in turn interfaces with a multicast announcement server 822 and a multicast delivery server 824. The multicast announcement server 822 is operative to announce to all end users in a given community the estimated time and address of upcoming multicasts. The multicast delivery server 824 is operative to deliver the multicasts to the cache 808, of each end user client 802 associated with the given community.

Referring now to FIG. 8B, it is appreciated that whereas in the embodiment of FIG. 8A, each community is served by a centralized community web server 818, in the embodiment of FIG. 8B, a generic web server facility 850, including one or more servers which may be at disparate locations, is employed to serve multiple communities. In this embodiment the generic web server facility 850 communicates with end users without regard to the communities to which they belong. Therefore, in the embodiment of FIG. 8B, a bandwidth allocator 854 is preferably co-located with a unicast/multicast decision switch 856.

In the embodiment of FIG. 8B, a community set-up manager 852 interfaces with the unicast/multicast decision switch 856, here incorporated with bandwidth allocator 854, and need not interface with the generic web server 850. Preferably, in the embodiment of FIG. 8B, decisions as to which content to multicast or unicast and as to the amount of bandwidth to allocate to the various multicasts are made by the co-located unicast/multicast decision switch 856 and bandwidth allocator 854. Therefore, the generic web server facility 850 is required to continually update the unicast/multicast decision switch 856 as to all web pages queried and as to the community identification thereof.

The remainder of the embodiment of FIG. 8B is identical to that of FIG. 8A. Identical elements are identified in FIG. 8B by the same reference numerals employed in FIG. 8A.

The embodiment of FIG. 8B has an advantage over the embodiment of FIG. 8A in that in FIG. 8B, the web servers are generic and distributed among the various communities. A disadvantage of the embodiment of FIG. 8B relative to the embodiment of FIG. 8A is that greatly enhanced traffic is generated between generic web server facility 850 and the unicast/multicast decision switch 856.

Reference is now made to FIGS. 9A and 9B, which are simplified flow diagrams corresponding respectively to the simplified functional block diagrams of FIGS. 8A and 8B.

Turning to FIG. 9A, it seen that along a time scale from the top of FIG. 9A to the bottom thereof, initially users conduct browsing using browser 804 prior to formation of any community. Eventually, due to action of the profiler 806, a community is formed by community set-up manager 812 in response to a trigger from community creation server 810.

Following formation of a community, when end users who are members of the community engage in browsing, using browser 804, and when the demand among members of the community for a given web page exceeds a threshold established by unicast/multicast decision switch 816 of the community web server 818, the content of the given web page is multicast to the entire community subject to bandwidth availability constraints.

Following the multicast, end users of the community can access the content of the given web page from their local cache with nearly zero latency.

Referring now to FIG. 9B, it is seen that the states of the functionality may be identical to those shown in FIG. 9A. A principal difference is in that whereas in the embodiment of FIG. 9A, the threshold is established by unicast/multicast decision switch 816 of the community web server 818, in the embodiment of FIG. 9B, the threshold is established by the unicast/multicast decision switch 856 co-located with the bandwidth allocator 854.

Figure 10A:
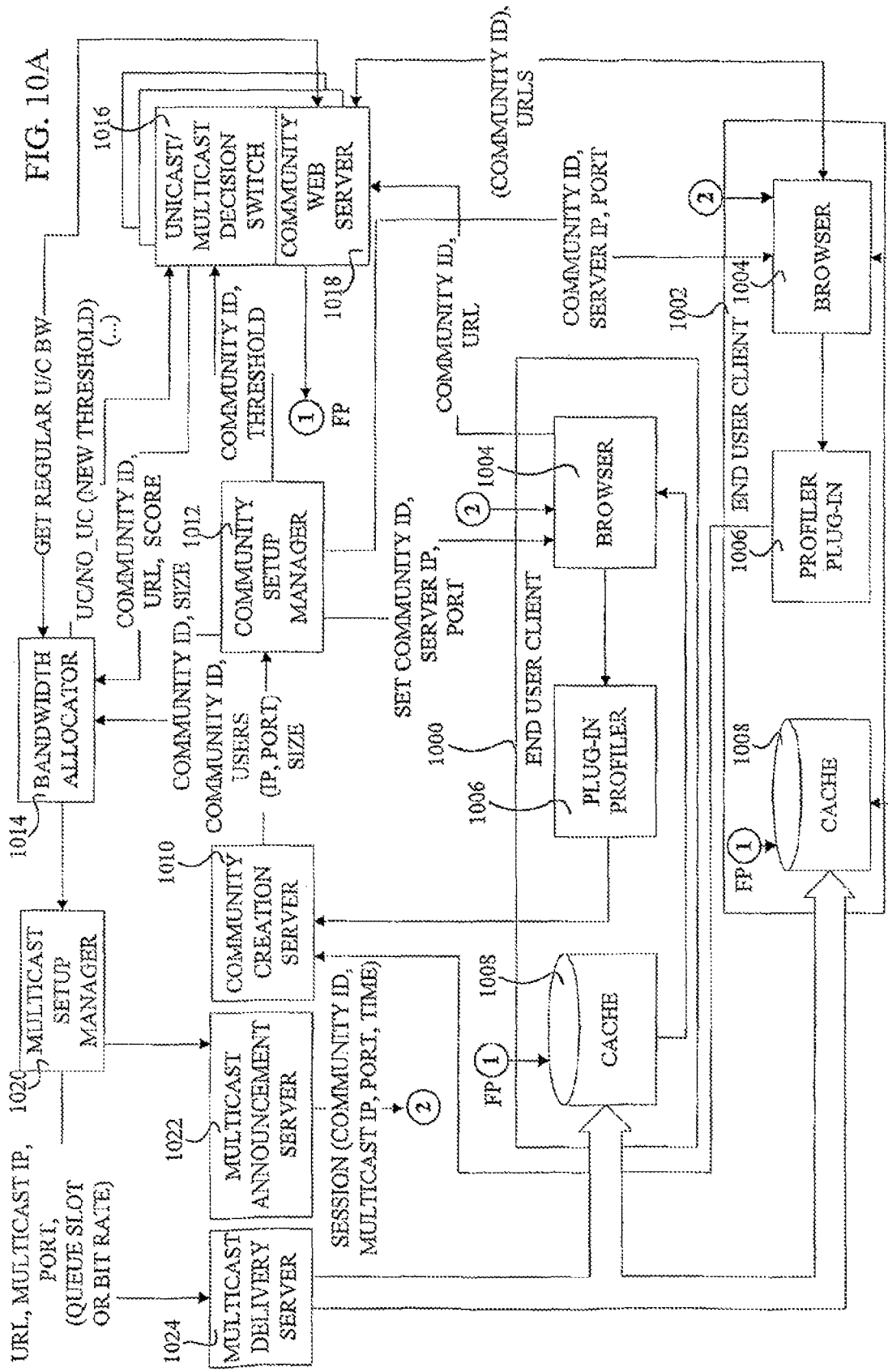

Reference is now made to FIGS. 10A and 10B, which are simplified functional block diagrams illustrating two alternative realizations of the functionality described in FIGS. 4A & 4B and FIG. 7B, and to FIGS. 11A and 11B are simplified flow diagrams corresponding respectively to the simplified functional block diagrams of FIGS. 10A and 10B.

Referring initially to FIG. 10A, typically two end-user clients 1000 and 1002 are shown, it being understood that a multiplicity of such end-user clients employ the system. Each of the end user clients 1000 and 1002 preferably includes a browser 1004, which communicates with a plug-in profiler 1006 and with a standard web cache 1008.

The standard web cache 1008 may be a standard cache such as an MICROSOFT INTERNET EXPLORER cache or alternatively may be an external proxy cache such as an APACHE proxy cache.

The combination of browser 1004 and cache 1008 is employed for conventional web surfing wherein the browser 1004 initially checks cache 1008 for requested URLs and only queries a web server, such as the community web server 1018, when the requested URL is not in cache or out of date.

Plug-in profiler 1006 stores historical surfing information relating to pages requested by the browser 1004. Profiler 1006 communicates with a community creation server 1010 at predetermined times or at times responsive to various possible criteria.

The community creation server 1010 preferably communicates with all end-user client profilers 1006. Community creation server 1010 preferably analyzes the client profiles and, on the basis of this analysis, dynamically creates, modifies, and deconstructs communities.

The community creation server 1010 preferably outputs to a community set-up manager 1012, which configures the various end users in accordance with community creation/modification/deconstruction instructions received from server 1010. Community set-up manager 1012 also interfaces with a bandwidth allocator 1014 in order to enable the bandwidth allocator 1014 to make appropriate bandwidth allocation determinations.

Community set-up manager 1012 also interfaces with a unicast/multicast decision switch 1016, which is operative to send content by unicast, until the simultaneous demand for such content justifies sending the content by multicast. Unicast/multicast decision switch 1016 is preferably incorporated into a community web server 1018.

In accordance with a preferred embodiment of the present invention, each community is served by a single community web server 1018 and associated unicast/multicast decision switch 1016.

When and so long as simultaneous demand for a given web page exceeds a given threshold, unicast/multicast switch 1016 triggers bandwidth allocator 1014 to allocate multicast forward path bandwidth for multicast of that web page. Bandwidth allocator 1014 may employ a dynamic pre-emptive queue of URLs for such allocation.

In practice, the bandwidth allocator 1014 may be responsive to the amount of available bandwidth for dynamically changing the threshold of switch 1016.

In contrast to the embodiment of FIGS. 8A-9B, here all unicast traffic is forwarded over the broadcast forward path from web server 1018 to cache 1008. Bandwidth allocator 1014 takes into account both unicast and multicast traffic in allocating the available bandwidth of the forward path. Bandwidth allocator 1014 essentially makes two different types of decisions: allocation between unicast and multicast and allocation of the multicast bandwidth among communities and URLs. It is appreciated that the bandwidth allocation is performed by a logical entity, which may be embodied in one or more physically distributed network elements, such as routers.

Bandwidth allocator 1014 additionally interfaces with a multicast set-up manager 1020 which in turn interfaces with a multicast announcement server 1022 and a multicast delivery server 1024. The multicast announcement server 1022 is operative to announce to all end users in a given community, the estimated time and address of upcoming multicasts. The multicast delivery server 1024 is operative to deliver the multicasts to the cache 1008, of each end user client 1002 associated with the given community.

Referring now to FIG. 10B, it is appreciated that whereas in the embodiment of FIG. 10A, each community is served by a centralized community web server 1018, in the embodiment of FIG. 10B, a generic web server facility 1050, including one or more servers which may be at disparate locations, is employed to serve multiple communities. In this embodiment the generic web server facility 1050 communicates with end users without regard to the communities to which they belong. Therefore, in the embodiment of FIG. 10B, a bandwidth allocator 1054 is preferably co-located with a unicast/multicast decision switch 1056.

In the embodiment of FIG. 10B, a community set-up manager 1052 interfaces with the unicast/multicast decision switch 1056, here incorporated with bandwidth allocator 1054, and need not interface with the generic web server 1050. Preferably, in the embodiment of FIG. 10B, decisions as to which content to multicast or unicast and as to the amount of bandwidth to allocate to the various multicasts are made by the co-located unicast/multicast decision switch 1056 and bandwidth allocator 1054. Therefore, the generic web server facility 1050 is required to continually update the unicast/multicast decision switch 1056 as to all web pages queried and as to the community identification thereof.

The remainder of the embodiment of FIG. 10B is identical to that of FIG. 10A. Identical elements are identified in FIG. 10B by the same reference numerals employed in FIG. 10A.

The embodiment of FIG. 10B has an advantage over the embodiment of FIG. 10A in that in FIG. 10B, the web servers are generic and distributed among the various communities. A disadvantage of the embodiment of FIG. 10B relative to the embodiment of FIG. 10A is that greatly enhanced traffic is generated between generic web server facility 1050 and the unicast/multicast decision switch 1056.

Reference is now specifically made to FIGS. 11A and 11B, which are simplified flow diagrams corresponding respectively to the simplified functional block diagrams of FIGS. 10A and 10B.

Turning to FIG. 11A, it seen that along a time scale from the top of FIG. 11A to the bottom thereof, initially users conduct browsing using browser 1004 prior to formation of any community. Eventually, due to action of the profiler 1006, a community is formed by community set-up manager 1012 in response to a trigger from community creation server 1010.

Following formation of a community, when end users who are members of the community engage in browsing, using browser 1004, and when the demand among members of the community for a given web page exceeds a threshold established by unicast/multicast decision switch 1016 of the community web server 1018, the content of the given web page is multicast to the entire community subject to bandwidth availability constraints.

Following the multicast, end users of the community can access the content of the given web page from their local cache with nearly zero latency.

It is noted that in contrast to the embodiment of FIG. 9A, in the embodiment of FIG. 11A during both pre-community formation browsing and post-community formation browsing, the community web server 1018 requests forward path bandwidth from bandwidth allocator 1014.

Referring now to FIG. 11B, it is seen that the states of the functionality may be identical to those shown in FIG. 11A. A principal difference is in that whereas in the embodiment of FIG. 11A, the threshold is established by unicast/multicast decision switch 1016 of the community web server 1018, in the embodiment of FIG. 11B, the threshold is established by the unicast/multicast decision switch 1056, co-located with the bandwidth allocator 1054.

Figure 12A:
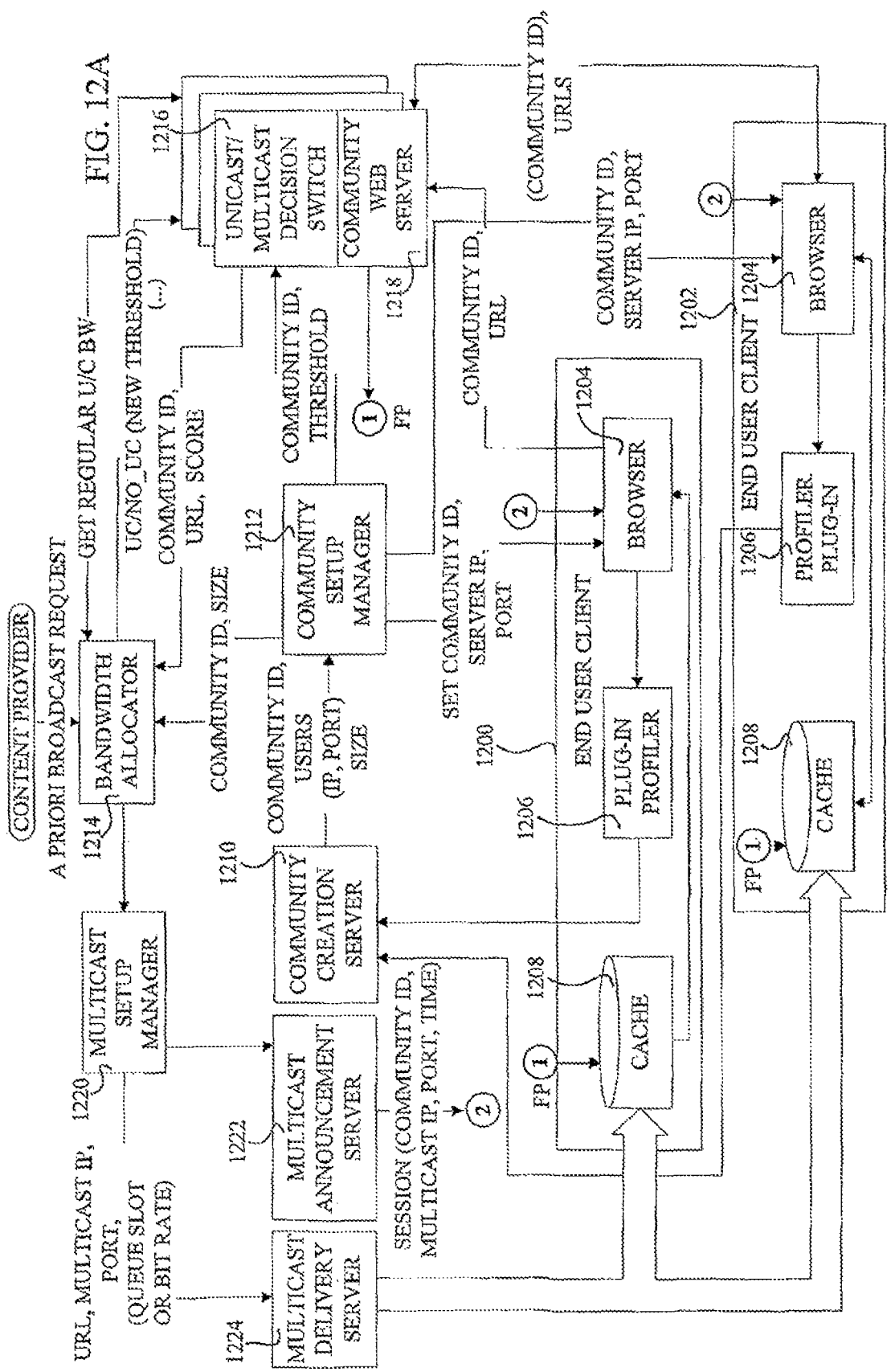
FIGS. 12A and 12B are simplified functional block diagrams illustrating two alternative realizations of the functionality described in FIG. 4C and FIG. 7C.
Figure 12B:
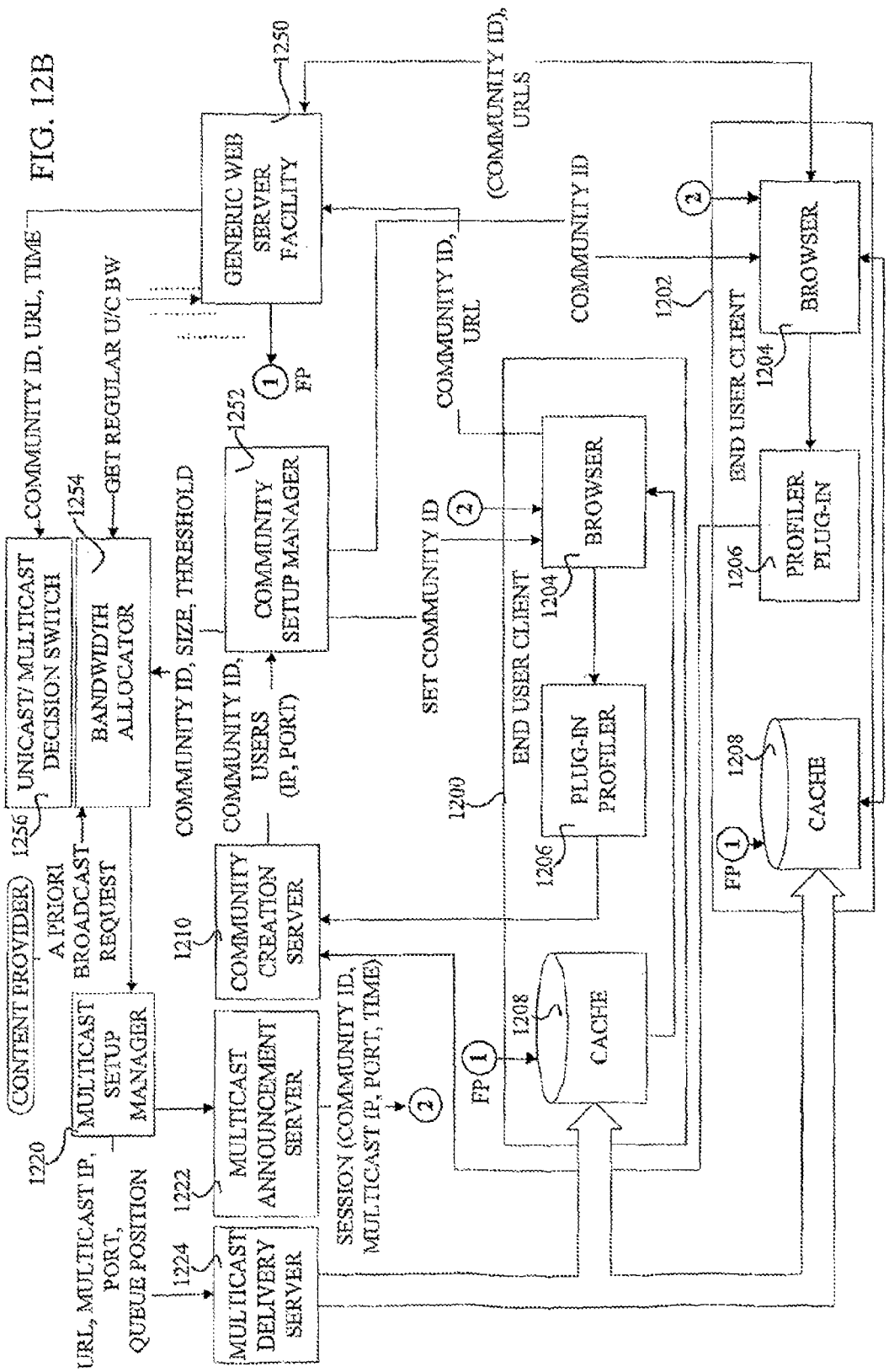

Reference is now made to FIGS. 12A and 12B, which are simplified functional block diagrams illustrating two alternative realizations of the functionality described in FIGS. 4C, 6B-6E and 7C and also to FIGS. 13A and 13B, which are simplified flow diagrams corresponding respectively to the simplified functional block diagrams of FIGS. 12A and 12B.

Referring initially to FIG. 12A, typically two end-user clients 1200 and 1202 are shown, it being understood that a multiplicity of such end-user clients employ the system. Each of the end user clients 1200 and 1202 preferably includes a browser 1204 which communicates with a plug-in profiler 1206 and with a standard web cache 1208.

The standard web cache 1208 may be a standard cache such as an MICROSOFT INTERNET EXPLORER cache or alternatively may be an external proxy cache such as an APACHE proxy cache.

The combination of browser 1204 and cache 1208 is employed for conventional web surfing wherein the browser 1204 initially checks cache 1208 for requested URLs and only queries a web server, such as the community web server 1218, when the requested URL is not in cache or out of date.

Plug-in profiler 1206 stores historical surfing information relating to pages requested by the browser 1204. Profiler 1206 communicates with a community creation server 1210 at predetermined times or at times responsive to various possible criteria.

The community creation server 1210 preferably communicates with all end-user client profilers 1206. Community creation server 1210 preferably analyzes the client profiles and, on the basis of this analysis, dynamically creates, modifies and deconstructs communities.

The community creation server 1210 preferably outputs to a community set-up manager 1212, which configures the various end users in accordance with community creation/modification/deconstruction instructions received from server 1210. Community set-up manager 1212 also interfaces with a bandwidth allocator 1214 in order to enable the bandwidth allocator 1214 to make appropriate bandwidth allocation determinations.

In contrast with the embodiment of FIG. 10A, in the embodiment of FIG. 12A, the bandwidth allocator 1214 also interfaces with a content provider which makes a priori broadcast requests which require allocation of forward path bandwidth thereto by the bandwidth allocator 1214. The content provider may distinguish in its a priori broadcast requests between "must have" and "nice to have" broadcast requests, allowing the bandwidth allocator 1214 a certain, limited, measure of discretion in terms of allocation of bandwidth for "nice to have" broadcast requests.

Community set-up manager 1212 also interfaces with a unicast/multicast decision switch 1216, which is operative to send content by unicast, until the simultaneous demand for such content justifies sending the content by multicast. Unicast/multicast decision switch 1216 is preferably incorporated into a community web server 1218.

In accordance with a preferred embodiment of the present invention, each community is served by a single community web server 1218 and associated unicast/multicast decision switch 1216.

When and so long as simultaneous demand for a given web page exceeds a given threshold, unicast/multicast switch 1216 triggers bandwidth allocator 1214 to allocate multicast forward path bandwidth for multicast of that web page. Bandwidth allocator 1214 may employ a dynamic pre-emptive queue of URLs for such allocation.

In practice, the bandwidth allocator 1214 may be responsive to the amount of available bandwidth for dynamically changing the threshold of switch 1216.

All unicast traffic is forwarded over the broadcast forward path from web server 1218 to cache 1208. Bandwidth allocator 1214 takes into account both unicast and multicast traffic in allocating the available bandwidth of the forward path. Bandwidth allocator 1214 essentially makes two different types of decisions: allocation between unicast and multicast and allocation of the multicast bandwidth among communities and URLs. It is appreciated that the bandwidth allocation is performed by a logical entity, which may be embodied in one or more physically distributed network elements, such as routers.

Bandwidth allocator 1214 additionally interfaces with a multicast set-up manager 1220 which in turn interfaces with a multicast announcement server 1222 and a multicast delivery server 1224. The multicast announcement server 1222 is operative to announce to all end users in a given community the estimated time and address of upcoming multicasts. The multicast delivery server 1218 is operative to deliver the multicasts to the cache 1208, of each end user client 1202 associated with the given community.

Referring now to FIG. 12B, it is appreciated that whereas in the embodiment of FIG. 12A, each community is served by a centralized community web server 1218, in the embodiment of FIG. 12B, a generic web server facility 1250, including one or more servers which may be at disparate locations, is employed to serve multiple communities. In this embodiment the generic web server facility 1250 communicates with end users without regard to the communities to which they belong. Therefore, in the embodiment of FIG. 12B, a bandwidth allocator 1254 is preferably co-located with a unicast/multicast decision switch 1256.

In the embodiment of FIG. 12B, a community set-up manager 1252 interfaces with the unicast/multicast decision switch 1256, here incorporated with bandwidth allocator 1254, and need not interface with the generic web server 1250. Preferably, in the embodiment of FIG. 12B, decisions as to which content to multicast or unicast and as to the amount of bandwidth to allocate to the various multicasts are made by the co-located unicast/multicast decision switch 1256 and bandwidth allocator 1254. Therefore, the generic web server facility 1250 is required to continually update the unicast/multicast decision switch 1256 as to all web pages queried and as to the community identification thereof.

The remainder of the embodiment of FIG. 12B is identical to that of FIG. 12A. Identical elements are identified in FIG. 12B by the same reference numerals employed in FIG. 12A.

The embodiment of FIG. 12B has an advantage over the embodiment of FIG. 12A in that in FIG. 12B, the web servers are generic and distributed among the various communities. A disadvantage of the embodiment of FIG. 12B relative to the embodiment of FIG. 12A is that greatly enhanced traffic is generated between generic web server facility 1250 and the unicast/multicast decision switch 1256.

Reference is now specifically made to FIGS. 13A and 13B, which are simplified flow diagrams corresponding respectively to the simplified functional block diagrams of FIGS. 12A and 12B.

Turning to FIG. 13A, it seen that along a time scale from the top of FIG. 13A to the bottom thereof; initially users conduct browsing using browser 1204 prior to formation of any community. Eventually, due to action of the profiler 1206, a community is formed by community set-up manager 1212 in response to a trigger from community creation server 1210.

Following formation of a community, when end users who are members of the community engage in browsing, using browser 1204, and when the demand among members of the community for a given web page exceeds a threshold established by unicast/multicast decision switch 1216 of the community web server 1218, the content of the given web page is multicast to the entire community subject to bandwidth availability constraints.

Following the multicast, end users of the community can access the content of the given web page from their local cache with nearly zero latency.

During both pre-community formation browsing and post-community formation browsing, the community web server 1218 requests forward path bandwidth from bandwidth allocator 1214.

Referring now to FIG. 13B, it is seen that the states of the functionality may be identical to those shown in FIG. 13A. A principal difference is in that whereas in the embodiment of FIG. 13A, the threshold is established by unicast/multicast decision switch 1216 of the community web server 1218, in the embodiment of FIG. 13B, the threshold is established by the unicast/multicast decision switch 1256, co-located with the bandwidth allocator 1254.

Figure 14:
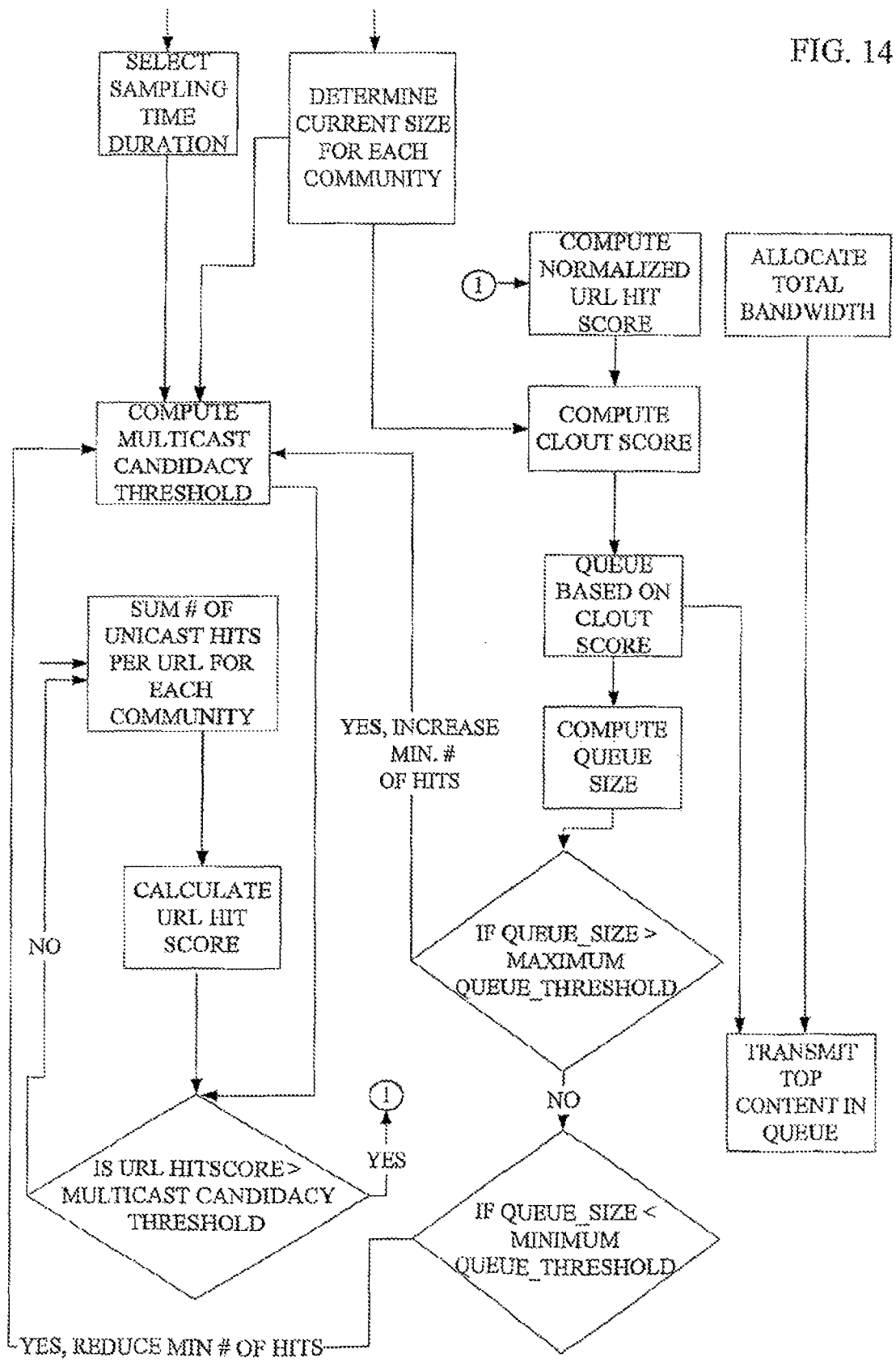
FIG. 14 is a simplified flowchart illustrating the operation of an algorithm for bandwidth allocation in an unicast-multicast environment, wherein unicast and multicast do not share the same bandwidth.

Reference is now made to FIG. 14, which is a simplified flowchart illustrating the operation of an algorithm for bandwidth allocation in a unicast-multicast environment, wherein unicast and multicast do not share the same bandwidth. As seen in FIG. 14, there is provided an algorithm for bandwidth allocation in which a sampling time duration, typically of the order of minutes, is selected, and the current community size is determined for each community.

A multicast candidacy threshold for each community is determined using data regarding current community size for a selected sampling time duration. The determination of the multicast candidacy threshold is preferably carried out as follows:

An initial assumption is made as to the minimum number of hits on a site for a given population of potential surfers over a given time duration, which characterizes a "popular site". The multicast candidacy threshold for each community is taken to be this minimum number multiplied by the sampling time duration and multiplied by the current size of each community.

The number of hits per URL for each community during each sampling time duration is monitored and converted to a URL hit score, which may be weighted according to trends in the number of hits per URL.

Multicast candidacy of a given site is determined by applying the multicast candidacy threshold to the URL hit score. If a given site is not considered as a multicast candidate, the number of hits thereon per community nevertheless continues to be monitored.

If a given site is considered to be a multicast candidate, the URL hit score is normalized for the community size and used to create a clout score based not only on per capita popularity but also on the community size. This clout score could be identical to the URL hit score, but need not necessarily be so, inasmuch as various types of linear and non-linear weightings may be incorporated in the clout score.

The candidate sites are queued based on their respective clout scores. The queue positions of the candidate sites may vary over time in accordance with variations in their clout scores.

The content of the site having the highest queue position is multicasted to the extent of the availability of multicast bandwidth.

Determination of the multicast candidacy threshold may be made in accordance with the length of the queue of candidate sites. This may be done in the following manner:

If the queue size exceeds a predetermined maximum queue threshold, the multicast candidacy threshold is modified by increasing the minimum number of hits on a site for a given population of potential surfers over a given time duration, which is required to characterize a site as a "popular site".

Similarly, if the queue size falls below a predetermined minimum queue threshold, the multicast candidacy threshold may be modified by reducing the minimum number of hits on a site for a given population of potential surfers over a given time duration, which is required to characterize a site as a "popular site".

The amount of bandwidth allocated to multicasting of site content to members of each community may be monitored.

Figure 15:
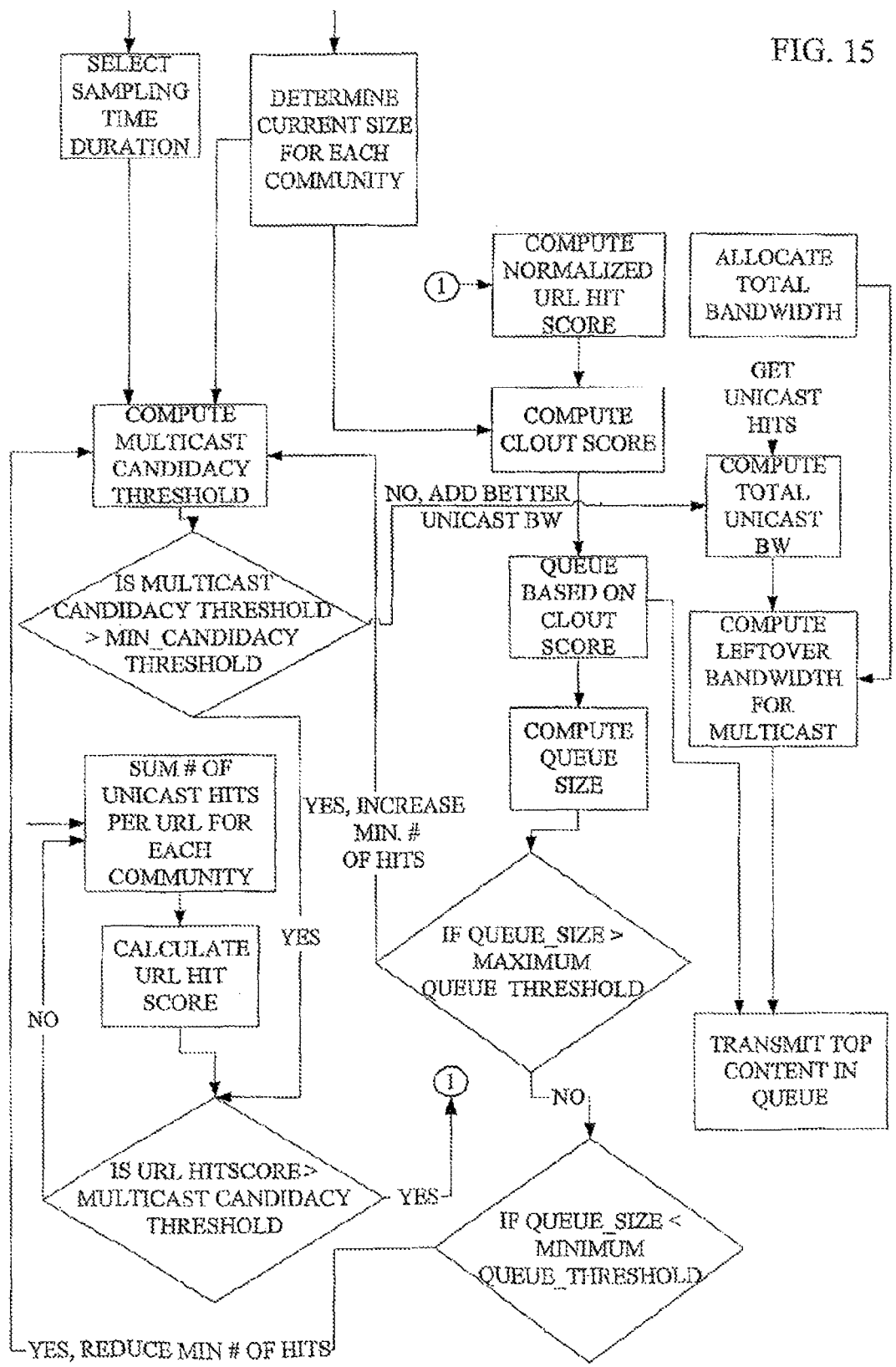
FIG. 15 is a simplified flowchart illustrating the operation of an algorithm for bandwidth allocation in a unicast-multicast environment, wherein unicast and multicast do share the same bandwidth.

Reference is now made to FIG. 15, which is a simplified flowchart illustrating the operation of an algorithm for bandwidth allocation in a unicast-multicast environment, wherein unicast and multicast share the same bandwidth. As seen in FIG. 14, a sampling time duration, typically of the order of minutes, is selected and the current community size is determined for each community.

A multicast candidacy threshold for each community is determined using data regarding ennead community size for a selected sampling time duration. The determination of the multicast candidacy threshold is preferably carried out as follows:

An initial assumption is made as to the minimum number of hits on a site for a given population of potential surfers over a given time duration, which characterizes a "popular site". The multicast candidacy threshold for each community is taken to be this minimum number multiplied by the sampling time duration and multiplied by the current size of each community.

The number of hits per URL for each community during each sampling time duration is monitored and converted to a URL hit score, which may be weighted according to trends in the number of hits per URL.

Multicast candidacy of a given site is determined by applying the multicast candidacy threshold to the URL hit score. If a given site is not considered as a multicast candidate, the number of hits thereon per community nevertheless continues to be monitored.

If a given site is considered to be a multicast candidate, the URL hit score is normalized for the community size and used to create a clout score based not only on per capita popularity but also on the community size. This clout score could be identical to the URL hit score, but need not necessarily be so, inasmuch as various types of linear and non-linear weightings may be incorporated in the clout score.

The candidate sites are queued based on their respective clout scores. The queue positions of the candidate sites may vary over time in accordance with variations in their clout scores.

The content of the site having the highest queue position is multicasted to the extent of the availability of multicast bandwidth. In the embodiment of FIG. 15, the availability of multicast bandwidth is determined in part by the utilization of commonly available bandwidth by unicast, which has a higher priority than multicast. Thus it may be understood that multicast bandwidth is "leftover" bandwidth which is not utilized by unicast.

The embodiment of FIG. 15, which involves sharing bandwidth between unicast and multicast, has an additional important features that increased multicasting of site content lowers the requirement for unicast bandwidth. This, in turn, makes more multicast bandwidth available. The increased availability of multicast bandwidth tends to reduce the length of the queue for transmission. With this in mind, it may be appreciated that determination of the multicast candidacy threshold may be made in accordance with the length of the queue of candidate sites, typically in a manner somewhat different from that described hereinabove in connection with FIG. 14.

If the queue size falls below a predetermined queue threshold, similarly to the situation in FIG. 14, the multicast candidacy threshold is modified by reducing the minimum number of hits on a site for a given population of potential surfers over a given time duration, which is required to characterize a size as a "popular site". In this case, however, the multicast candidacy threshold is not permitted to fall below a minimum multicast candidacy threshold. If the minimum multicast candidacy threshold is reached, the remaining available bandwidth is allocated to unicast transmission in order to reduce latency thereof.

Figure 16:
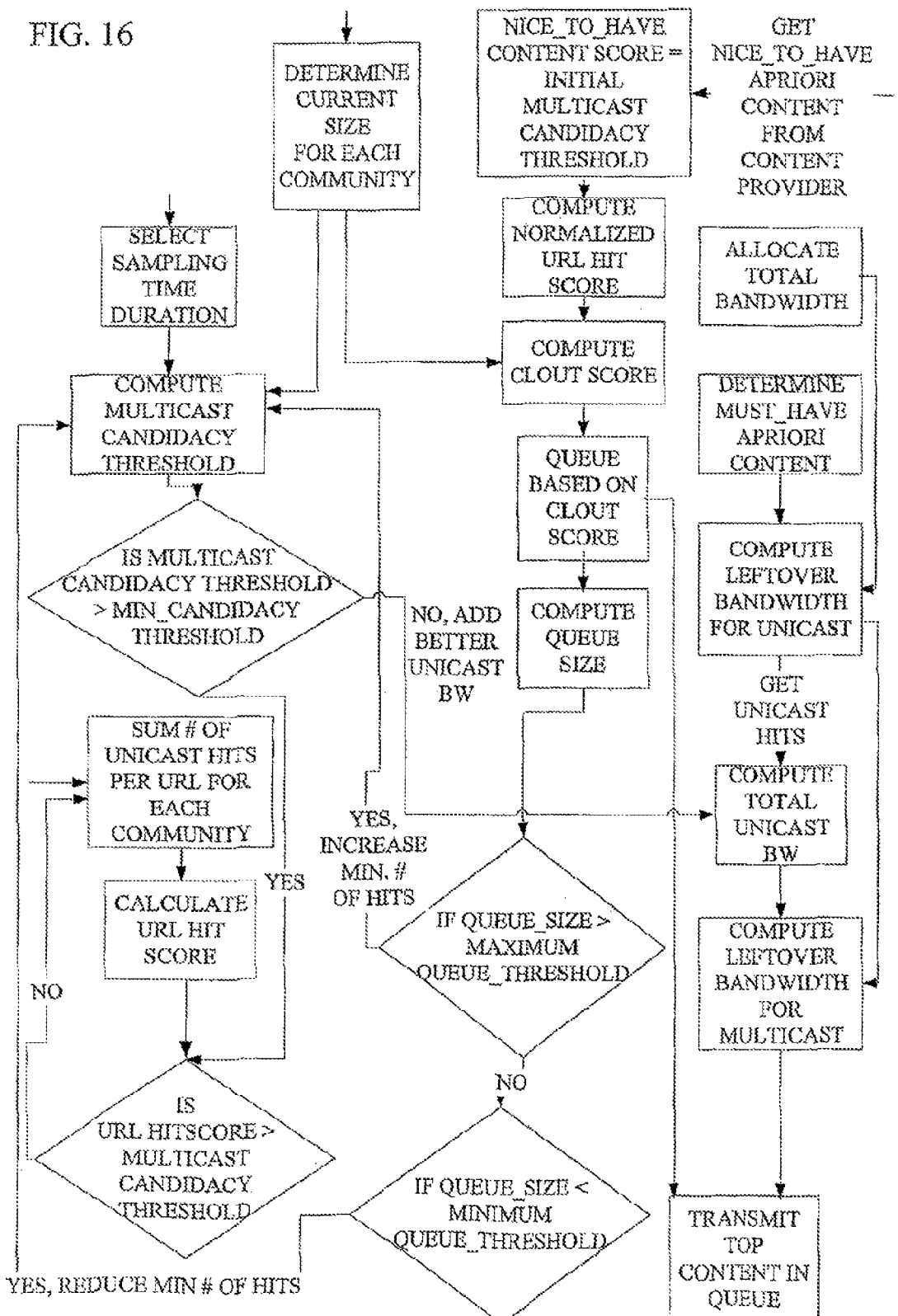
FIG. 16 is a simplified flowchart illustrating the operation of an algorithm for bandwidth allocation in an unicast-multicast environment, wherein unicast, a priori multicast and triggered multicast share the same bandwidth.

Reference is now made to FIG. 16, which is a simplified flowchart illustrating the operation of an algorithm for bandwidth allocation in a unicast-multicast environment, wherein unicast, a priori multicast and triggered multicast share the same bandwidth. As seen in FIGS. 14 and 15, a sampling time duration, typically of the order of minutes, is selected and the current community size is determined for each community.

A multicast candidacy threshold for each community is determined using data regarding current community size for a selected sampling time duration. The determination of the multicast candidacy threshold is preferably carried out as follows:

An initial assumption is made as to the minimum number of hits on a site for a given population of potential surfers over a given time duration, which characterizes a "popular site". The multicast candidacy threshold for each community is taken to be this minimum number multiplied by the sampling time duration and multiplied by the, current size of each community.

The number of hits per URL for each community during each sampling time duration is monitored and converted to a URL hit score, which may be weighted according to trends in the number of hits per URL.

Multicast candidacy of a given site is determined by applying the multicast candidacy threshold to the URL hit score. If a given site is not considered as a multicast candidate, the number of hits thereon per community nevertheless continues to be monitored.

If a given site is considered to be a multicast candidate, the URL hit score is normalized for the community size and used to create a clout score based not only on per capita popularity but also on the community size. This clout score could be identical to the URL hit score, but need not necessarily be so, inasmuch as various types of linear and non-linear weightings may be incorporated in the clout score.

The candidate sites are queued based on their respective clout scores. The queue positions of the candidate sites may vary over time in accordance with variations in their clout scores.

The content of the site having the highest queue position is multicasted to the extent of the availability of multicast bandwidth. In the embodiment of FIG. 16, the availability of multicast bandwidth is determined in part by the utilization of commonly available bandwidth by unicast, which has a higher priority than multicast and in part by a priori multicast broadcasting.

A priori multicast broadcasting typically includes a portion, here termed "must have", which has the highest priority for bandwidth, exceeding that of unicast and all other multicast. A priori multicast broadcasting may also include a portion, here termed "nice to have", which has a lower priority than "must have" and typically has the same priority as other multicast transmissions. In the preferred embodiment of FIG. 16, "nice to have" multicast, is given a static clout score which is an average clout score among multicast candidates.

Thus it may be understood that unicast bandwidth is "leftover" bandwidth which is not utilized by "must have" a priori multicast and non "must have" multicast bandwidth, including "nice to have" a priori and other multicast, is "leftover" bandwidth which is not utilized by unicast.

The embodiment of FIG. 16, which involves sharing bandwidth between a priori multicast, unicast and multicast, also has the additional feature that increased multicasting of site content lowers the requirement for unicast bandwidth. This, in turn, makes more multicast bandwidth available. The increased availability of multicast bandwidth tends to reduce the length of the queue for transmission. With this in mind, it may be appreciated that determination of the multicast candidacy threshold may be made in accordance with the length of the queue of candidate sites, typically in a manner described hereinabove in connection with FIG. 15.

It will be appreciated by persons skilled in the art that the present invention is not limited by what has been particularly shown and described hereinabove. Rather the scope of the present invention includes both combinations and subcombinations of the various features described hereinabove as well as variations and modifications which would occur to persons skilled in the art upon reading the specification and which are not in the prior art.

The invention claimed is:

1. A system for providing content to users comprising:
a multicast sub-system providing content to multiple users;
a unicast sub-system providing content to individual users, said unicast sub-system is operative to provide on demand to a user, content which has not been previously pushed to said user;
wherein said multicast sub-system is operative to push to each of a plurality of user communities, content relating to said each user community based on at least a-priori determinations and current demand;
wherein the system also provides broadcast, including transmission of content to all users within a geographical foot print of the broadcast, including transmission of content in a pay access regime; and
wherein there is defined a minimum multicast threshold which is a relative threshold determined by relative demands for various available content.

2. A system according to claim 1 and also comprising a plurality of satellites having at least one of the following functionalities: broadcast, multicast and unicast.

3. A system according to claim 1 and also comprising at least one of cable networks, digital terrestrial networks, microwave networks, cellular networks and DSL networks having at least one of the following functionalities: broadcast, multicast and unicast.

4. A system according to claim 1 and comprising PSTN facilities providing unicast functionality.

5. A system according to claim 1 and wherein unicast functionality is provided by facilities which also simultaneously provide broadcast and multicast functionalities.

6. A system according to claim 1 and wherein multicast includes transmission of content to all users within a community having a predefined common interest, within a geographical footprint of a broadcast.

7. A system according to claim 1 and wherein unicast includes transmission of content to an individual user based on a request from that user.

8. A system according to claim 1 and wherein as a community grows, the amount of bandwidth allocated to that community increases.

9. A system according to claim 1 and wherein as a community decreases in size, the amount of bandwidth allocated to that community decreases.

10. A method for providing content to users comprising:
multicasting content to multiple users;
unicasting content to individual users, said unicasting including providing on demand to a user, content which has not been previously pushed to said user;
wherein said multicasting includes pushing to each of the plurality of user communities, content relating to said each user community based on at least a-priori determinations and current demand;
including broadcast of content to all users within a geographical footprint of a broadcast, including transmission of content in a pay access regime; and
defining a minimum multicast threshold which is a relative threshold determined by relative demands for various available content.

11. A method according to claim 10 and wherein multicasting includes transmission of content to all users within a community having a predefined common interest, within a geographical footprint of a broadcast.

12. A method according to claim 10 and wherein unicasting includes transmission of content to an individual user based on a request from that user.

13. A method according to any claim 10 and wherein as a community grows, the amount of bandwidth allocated to that community increases.

14. A method according to claim 10 and wherein as a community decreases in size, the amount of bandwidth allocated to that community decreases.

* * * * *